(12) United States Patent
Himelstein et al.

(10) Patent No.: US 10,713,334 B1
(45) Date of Patent: *Jul. 14, 2020

(54) DATA PROCESSING SYSTEM WITH A SCALABLE ARCHITECTURE OVER ETHERNET

(71) Applicant: EMC IP Holding Company LLC, Hopkinton, MA (US)

(72) Inventors: Mark Himelstein, Emerald Hills, CA (US); Bruce Wilford, Los Altos, CA (US); Richard Van Gaasbeck, Mountain View, CA (US); Todd Wilde, Mountain View, CA (US); Rick Carlson, Pacific Palisades, CA (US); Vikram Venkataraghavan, Saratoga, CA (US); Vishwas Durai, Los Altos, CA (US); Blair Barnett, Mountain View, CA (US); Kevin Rowett, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,218

(22) Filed: Jun. 21, 2017

Related U.S. Application Data

(63) Continuation-in-part of application No. 15/179,120, filed on Jun. 10, 2016.
(Continued)

(51) Int. Cl.
*G06F 13/00* (2006.01)
*G06F 17/18* (2006.01)
*G05B 19/042* (2006.01)

(52) U.S. Cl.
CPC ......... *G06F 17/18* (2013.01); *G05B 19/0421* (2013.01); *G05B 2219/22* (2013.01)

(58) Field of Classification Search
CPC .... G06F 3/067; G06F 3/0683; G06F 13/4265; G06F 12/0815; G06F 2212/621; G06F 12/0868
See application file for complete search history.

(56) References Cited

U.S. PATENT DOCUMENTS

| | | |
|---|---|---|
| 6,658,539 B2 | 12/2003 | Arimilli et al. |
| 7,171,521 B2 | 1/2007 | Rowlands et al. |

(Continued)

OTHER PUBLICATIONS

Design and Analysis of Update-Based Cache Coherence Protocols for Scalable Shared-Memory Multiprocessors, David Brian Glasco, Technical Report No. CSL-TR-95-670, Jun. 1995.*

(Continued)

*Primary Examiner* — Yong J Choe
(74) *Attorney, Agent, or Firm* — Womble Bond Dickinson (US) LLP

(57) ABSTRACT

According to one embodiment, a data processing system includes a plurality of processing units, each processing unit having one or more processor cores. The system further includes a plurality of memory roots, each memory root being associated with one of the processing units. Each memory root includes one or more branches and a plurality of memory leaves to store data. Each of the branches is associated with one or more of the memory leaves and to provide access to the data stored therein. The system further includes a memory fabric coupled to each of the branches of each memory root to allow each branch to access data stored in any of the memory leaves associated with any one of remaining branches.

12 Claims, 24 Drawing Sheets

Related U.S. Application Data

(60) Provisional application No. 62/173,832, filed on Jun. 10, 2015, provisional application No. 62/186,284, filed on Jun. 29, 2015.

(56) References Cited

U.S. PATENT DOCUMENTS

| | | | |
|---|---|---|---|
| 7,613,882 B1 | 11/2009 | Akkawi et al. | |
| 8,656,115 B2* | 2/2014 | Kottapalli | G06F 12/0822 711/100 |
| 9,244,732 B2 | 1/2016 | West et al. | |
| 10,169,237 B2 | 1/2019 | Ohba et al. | |
| 2010/0095054 A1 | 4/2010 | Terasaki | |
| 2011/0179109 A1 | 7/2011 | Golbourn et al. | |
| 2012/0017037 A1 | 1/2012 | Riddle et al. | |
| 2012/0117322 A1 | 5/2012 | Satran et al. | |
| 2013/0311817 A1* | 11/2013 | Kim | G06F 1/04 713/501 |
| 2013/0343229 A1* | 12/2013 | Gasparakis | H04L 45/66 370/256 |
| 2014/0032796 A1 | 1/2014 | Krause | |
| 2014/0122776 A1 | 5/2014 | El Maghraoui et al. | |
| 2014/0173149 A1* | 6/2014 | Walker | G06F 9/45533 710/263 |
| 2014/0237175 A1 | 8/2014 | Felch et al. | |
| 2014/0237609 A1 | 8/2014 | Sharp et al. | |
| 2014/0244687 A1* | 8/2014 | Shmueli | G06F 17/30587 707/780 |
| 2014/0245444 A1 | 8/2014 | Lutas et al. | |
| 2014/0310441 A1 | 10/2014 | Klughart | |
| 2014/0331001 A1 | 11/2014 | Liu et al. | |
| 2015/0234612 A1 | 8/2015 | Himelstein et al. | |
| 2016/0246540 A1* | 8/2016 | Blagodurov | G06F 3/0647 |
| 2016/0350012 A1 | 12/2016 | Tamma et al. | |
| 2016/0357695 A1 | 12/2016 | Johnston et al. | |

OTHER PUBLICATIONS

Basu et al., Efficient Virtual Memory for Big Memory Servers (vol. ISCA '13), Tel-Aviv, Israel: Association for Computing Machinery, 2013.

Bernstein et al., Ryder—A Transactional Record Manager for Shared Flash. Asilomar, California, USA: CIDR '11, 2011.

Bhadauria et al., Optimizing Thread Throughput for Multithreaded Workloads on Memory Constrained CMPs, Computer Systems Lab, Cornell University, ACM 978-1-60558-077-7/08/052008, 2008.

Boukhobza et al., CACH-FTL: A Cache-Aware Configurable Hybrid Flash Translation Layer (vol. EICPDNP '13), USA: 21st Euromicro International Conference on Parallel, Distributed, and Network-Based Processing, 2013.

Huang et al., Improving Flash-based Disk Cache with Lazy Adaptive Replacement (vols. 978-1-4799-0218-7/13), Singapore, Singapore: IEEE, 2013.

Iliadis, Performance of the Greedy Garbage-Collection Scheme in Flash-Based Solid-State Drives. IBM, IBM Research—Zurich. IBM, 2010.

Jiang et al., Storage Coding for Wear Leveling in Flash Memories (vol. 16). USA: IEEE Transactions on Information Theory, 2010.

Narayanan et al., Migrating Server Storage to SSDs: Analysis and Tradeoffs (vol. EuroSys '09), Nuremberg, Germany: Association for Computing Machinery, 2009.

Polte et al., Enabling Enterprise Solid State Disks Performance. Eashington, DC, USA: 1st Workshop on Integrating Solid-state Memory into the Storage Hierarchy, 2009.

Rodrigues et al., Automatic Reconfiguration for Large-Scale Reliable Storage Systems (vol. 9), USA: IEEE Transactions on Dependable and Secure Computing, 2010.

Saxena et al., FlashVM: Virtual Memory Management on Flash, Boston, Massachusetts, USA: Usenix, 2010.

Sun et al., SCM Capacity and NAND Over-Provisioning Requirements for SCM/NAND Flash Hybrid Enterprise SSD. Tokyo, Japan: IEEE, 2013.

Welch et al., Optimizing a hybrid SSD/HDD HPC storage system based on file size distributions, Mass Storage Systems and Technologies (MSST), 2013 IEEE 29th Symposium on, MSST '13, Long Beach: IEEE, 2013.

Non-Final Office Action dated Jul. 25, 2018 for U.S. Appl. No. 15/179,120.

Non-Final Office Action dated Aug. 28, 2018 for U.S. Appl. No. 15/629,229.

Non-Final Office Action dated Sep. 21, 2018 for U.S. Appl. No. 15/629,247.

Non-Final Office Action dated Aug. 28, 2018 for U.S. Appl. No. 15/629,276.

Reducing cache coherence traffic with hierarchical directory cache and NU MA-aware runtime scheduling; Caheny et al.; 2016 International Conference on Parallel Architecture and Compilation Techniques; Sep. 11-15, 2016 (Year: 2016).

* cited by examiner

DATA PROCESSING SYSTEM WITH A SCALABLE ARCHITECTURE OVER ETHERNET

RELATED APPLICATIONS

This application is a continuation-in-part (CIP) application of U.S. application Ser. No. 15/179,120, filed Jun. 10, 2016, which claims the benefit of U.S. Provisional Patent Application No. 62/173,832, filed Jun. 10, 2015 and U.S. Provisional Application No. 62/186,284, filed Jun. 29, 2015.

This application is also related to U.S. application Ser. No. 15/629,229, entitled "Non-Uniform Memory Access (NUMA) Mechanism for Accessing Memory with Cache Coherence," filed Jun. 21, 2017, U.S. application Ser. No. 15/629,247, entitled "Software Implemented Flash Translation Layer Policies," filed Jun. 21, 2017, and U.S. application Ser. No. 15/629,276, entitled "Memory Complex with a Replication Interface to Replicate Data to Another Memory Complex over Ethernet," filed Jun. 21, 2017. The disclosure of the above-identified applications is incorporated by reference herein in its entirety.

TECHNICAL FIELD

Embodiments of the present invention relate generally to data processing systems. More particularly, embodiments of the invention relate to scalable multi-processing systems.

BACKGROUND

As increasingly larger data sets become available for analysis, organizations such as businesses and governments need to be able to exploit that data for faster, more accurate decision-making and more efficient operation. Furthermore, processing such data sets may involve solving certain classes of problems that are both data intensive and computationally intensive. Certain such data sets may reach petabyte-scale in size and require a high degree of parallel processing throughput. However, conventional data processing systems fail to provide efficient or even tenable high bandwidth access to petabyte-scale data sets. Consequently, analysis performed by conventional data processing systems on such petabyte-scale data sets is typically inefficient and sometimes impossible given practical system constraints.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
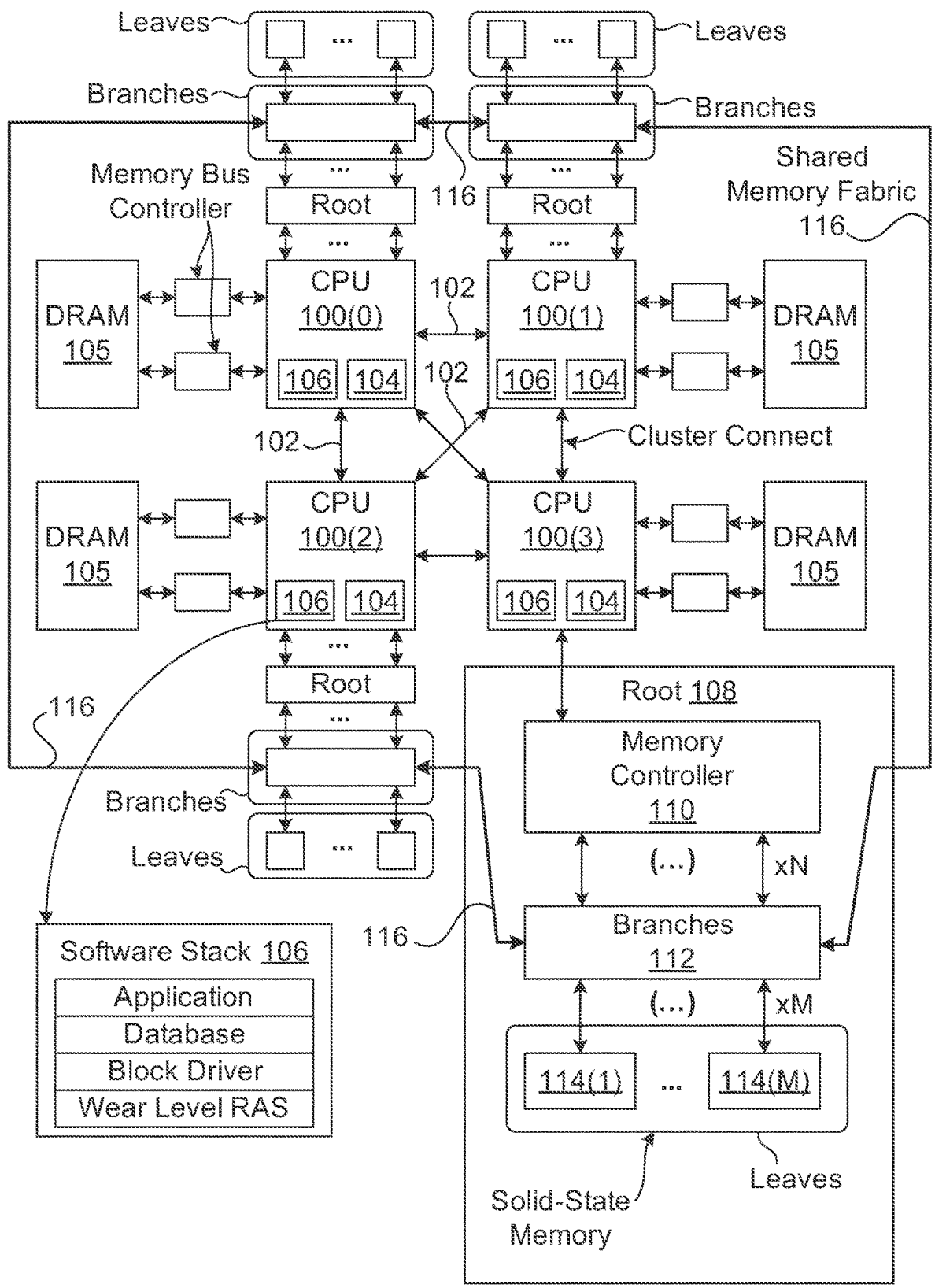
FIGS. 1A and 1B illustrate an exemplary system architecture of a data processing system according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, a data processing system includes a number of central processing unit (CPU) subsystems, a number of memory complexes, and an Ethernet switch fabric coupled to each of the CPU subsystems and memory complexes. Each CPU subsystem includes one or more CPUs and one or more memory controllers corresponding to the CPUs. Each memory complex corresponds to one of the CPU subsystems. Each memory complex includes one or more branches and an array of memory leaves to store data. Each of the branches is coupled to one or more of the memory leaves and provides access to the data stored in the memory leaves. The Ethernet switch fabric is coupled to each of the memory controllers of the CPU subsystems and each of the branches of the memory complexes. Each memory controller can communicate with each of the branches via the Ethernet switch fabric over the Ethernet to access data stored in any of the memory leaves associated with the corresponding branch.

According to another aspect of the invention, a data processing system includes a number of processors, a number of memory controllers corresponding to the processors, a number of memory targets, and an Ethernet switch fabric coupled to the memory controllers and the memory targets. Each of the processors is coupled to each of the remaining processors via a processor interconnect, such as a Quick Path Interconnect™ (QPI). Each memory target includes one or more branches and a number of memory leaves managed by the branches. When a first memory controllers writes data to a first memory leaf via a first branch corresponding to the first memory leaf, the first memory controller sends a cache coherence message to at least one of the remaining memory controllers to indicate that the data stored in the first memory leaf has been updated. A second of the remaining memory controllers may determine whether the corresponding data has been previously cached in their corresponding local memory (e.g., dynamic random access memory or DRAM). If so, the second memory controller may communicate with the first memory controller and/or the first branch, for example, over the Ethernet, to fetch the newly updated data from the first memory leaf and to update its local memory.

According to another aspect of the invention, at least some of the functionalities of a flash translation layer (FTL) are maintained in a software layer or software stack, for example, hosted by an operating system (OS) for efficient management of the underlying flash memory devices. In one embodiment, a page virtualization table (PVT) and one or more block virtualization tables (BVTs) are maintained in upper level software such as a storage layer software hosted by an operating system. The PVT includes a number of PVT entries and each PVT entry maps a logical page number (LPN) to a virtual page number (VPN). Each BVT includes a number of BVT entries and each BVT entry maps a virtual block number (VBN) to a physical block number (PBN). When a request is received for accessing data stored in one of the flash memory devices, a first search is performed in the PVT based on a first LPN obtained from the request. A matching PVT entry is found based on the first LPN and a first VPN is obtained from the matching PVT entry. A second search is performed in a BVT based on the first VPN to locate a matching BVT entry that matches the first VPN. A first PBN is obtained from the matching BVT entry. An IO request is then issued based on the first PBN to a flash controller associated with a first flash memory device that stores data corresponding to the first PBN.

According to a further aspect of the invention, a data processing system includes one or more CPU subsystems and a number of memory complexes. Each CPU subsystem includes one or more CPUs and one or more memory controllers corresponding to the CPUs. Each of the memory complexes is associated with one of the CPU subsystems. Each memory complex includes one or more branches, a number of memory leaves to store data, and a replication interface. Each branch manages one or more memory leaves and each memory leaf includes one or more memory devices such as solid state memory devices. The replication interface automatically replicates data received from one of the CPU subsystems to another one of the memory complexes, where the data is stored in one of the memory leaves.

System Overview

FIG. 1A is a block diagram illustrating a system architecture of a data processing system according to one embodiment. Referring to FIG. 1A, the system architecture includes several processing units such as central processing units (CPUs) 100, each with many computing "cores", interconnected internally by a high-speed interface. The CPUs 100 may be interconnected externally through a cluster interconnect 102, which may provide transport for cache coherence messages or other signals. In this way, each of the cores in each of the CPUs 100 may be presented with a coherent memory model. In certain embodiments, each CPU is associated with a local memory such as local memory 105, in this example, a dynamic random access memory (DRAM), or another similar type of memory. Each CPU also is associated with a local memory root such as local "memory root(s)" 108 to an extended memory, such as, for example, a solid-state memory device. As noted below, this block diagram represents one of many possible configurations of embodiments of the invention. In particular, a memory controller might use one of several interconnection protocols, for example JEDEC Double Data Rate 3 (DDR3), JEDEC Double Data Rate 4 (DDR4) or Intel Peripheral Component Interconnect Express (PCIe).

Each CPU may include a cache such as cache 104 configured to operate with its local memory. The computing cores within the CPUs may each be configured to execute a software stack 106 resident either in local memory 105 or in a memory associated with memory root 108. A memory root may be configured to include one or more branches 112 connected through memory controllers 110 to one or more associated CPUs. In one embodiment, software stack 106 includes application programs, a database, block drivers, and/or wear level Reliability Availability Serviceability (RAS) modules.

The number of simultaneous data accesses that can be serviced by a computer in general limits the performance of many data driven applications. The disclosed system provides a large number of memory devices having a large net cross-sectional interconnect bandwidth coupled to a multi-rooted interconnection coupled to multiple CPUs housing the computing cores. The multi-rooted interconnection provides efficient parallel access to the data, thereby enabling concurrent, parallel, and multi-threaded application programs to operate efficiently. As stated previously, specialized system software manages the efficient scheduling of the computation and data access.

In one embodiment, root memory controller 110 connects to a complex of interconnected CPUs 100, each having multiple cores (e.g., processor cores), and drives a hierarchy of branches 112 and leaves 114. In one embodiment, there may be 15 processor cores within a CPU and each of the processor cores can execute instructions of a particular thread. Such a processor core may be referred to as a thread processor or processor core. Note that each branch is attached either to another branch or a number of leaves or a mix of both. A leaf such as leaf 114 is composed of flash memory or other solid-state or digital memory. In particular, there may be 1024 or more memory chips attached to a single root (e.g., implemented in field programmable gate array(s) or FPGA(s), application-specific integrated circuit(s) or ASIC(s)) through branches. Each CPU complex can be connected to one or more roots (e.g., eight or more roots). Consequently, if FIG. 1A was accurate and to scale, the number of solid-state memory leaves would overwhelm the figure. In this architecture the CPUs have thousands of memory targets that may be accessed in parallel. The number of CPUs in the CPU complex and the size and number of memory trees can also increase to very large numbers. The balance reflects the need(s) of a particular use (application).

The components in this architecture are composed of both hardware and software. Some of the components may include: (1) a data management system, the database or data management system may be (a) multithreaded, (b) configured to utilize a single shared memory model, or a distributed memory model, or a combination of both, in order to achieve a high degree of parallelism; (2) a memory management system, the memory management system may be (a) multithreaded to exploit large multi-cored systems, (b) highly parallel, (c) configured to access and manage a very large capacity (e.g., >>100 TB); (3) a cache management system, the cache management system may be configured to maintain data coherency across individual processing nodes (computing cores); and (4) a memory system comprising roots, branches and leaves.

Some embodiments may implement a cache coherent memory model in which each CPU thread caches its state in the memory. In one embodiment, there are four roots sometimes referred to herein as Memory Modules (MMs). Conceptually, each root replaces a memory riser card in the computer's chassis. The MMs connect to a distribution network, providing an interface to a number of branches, each of which connects to a number of leaves.

Conceptually, moving down the memory management system encompasses greater parallelism, effectively multiplying the concurrent operations at each level as memory access moves from the root to the branch to the leaves.

The disclosed system may be built in a variety of configurations that are suited to particular usage patterns. Embodiments of the invention may be optimized for a large number of specific uses such as these large memory consumption applications: Business Intelligence, Business Analytics, Geo-Seismic, Medical Imaging, Molecular and Biopharmaceutical Modeling (e.g. protein-protein interaction simulation), Social Networking and Patient Management.

In one embodiment, a shared memory fabric 116 implements a data network for transmitting messages between branches 112 in the system. The data network may be an Ethernet, in which branches may communicate with each other using Ethernet protocols. While depicted here in conceptual form, any technically feasible network structure or topology may be implemented, including non-blocking cross-bar and mesh topologies.

In one embodiment, since memory fabric 116 couple all of the branches 112, each of branches 112 can communicate with any one of the remaining branches for accessing any one of leaves 114 of the branch, without having to invoke an associated processing unit. According to one embodiment, each of the processing unit is coupled to any one of DRAMs 105 of all the processing units (e.g., CPUs 100(0) to 100(3)), for example, via a shared memory bus, interconnect, or network, without having to invoke a corresponding processing unit. Thus, a particular processor core of a particular processing unit can access any one of DRAMs 105 or any one of memory leaves 114 of any one of the remaining processing units, without having to invoke the associated processing unit. By coupling all branches together via a shared memory fabric (or interconnect, bus, or any kind of communication fabrics), a processor core can access data stored in any of the memory leaves using a number of access paths, which are represented by various branches. If one path (e.g., via a first branch) fails, a processor core can access the same data via another path (e.g., via a second branch).

Figure 1B:
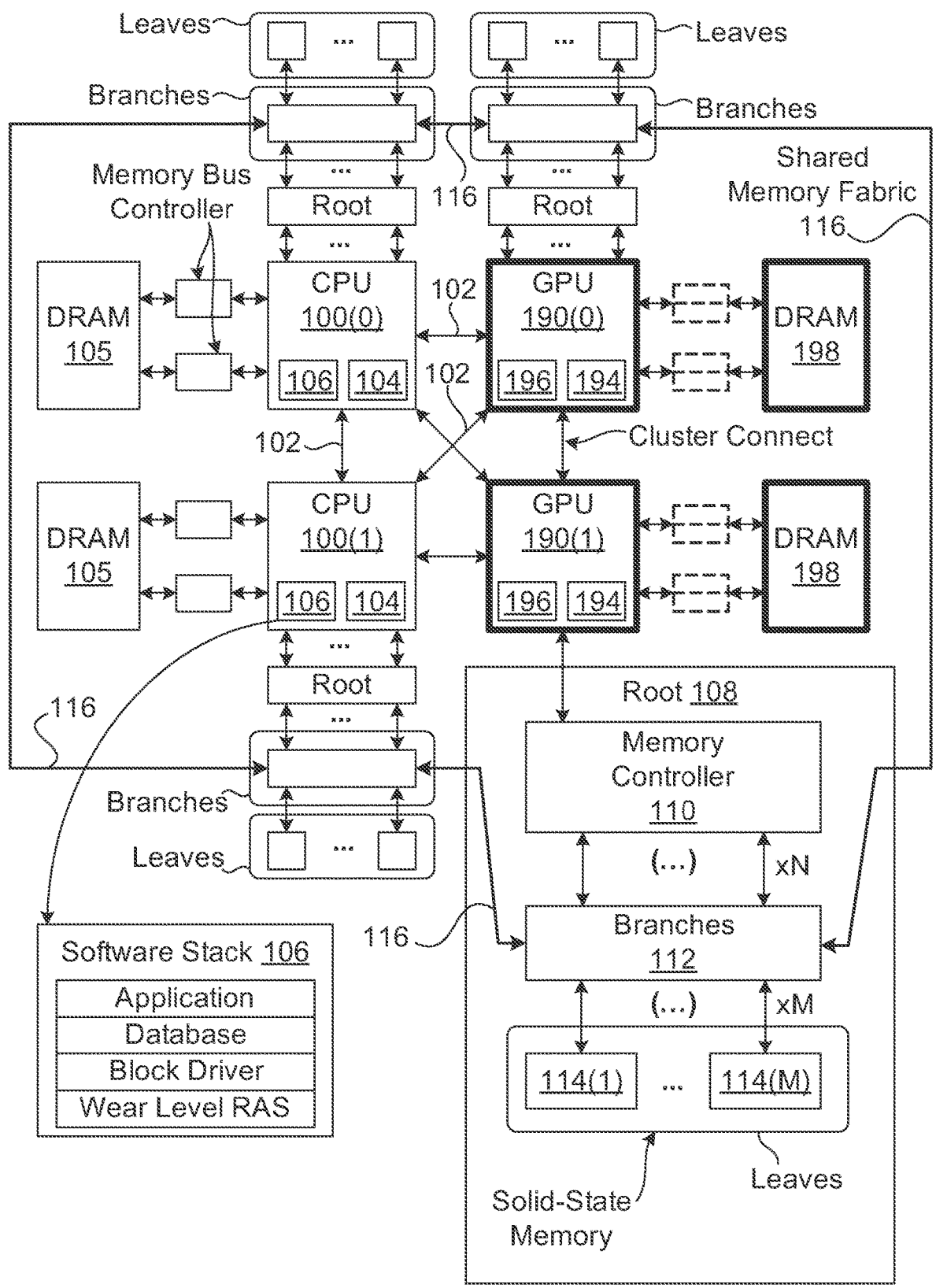

FIG. 1B is a block diagram illustrating a data processing system according to another embodiment of the invention. FIG. 1B illustrates an exemplary system architecture of the data processing system configured to include GPU resources, according to one embodiment. The system architecture includes one or more CPUs 100 and one or more GPUs 190. As shown, two CPUs 100 and two GPUs 190 are coupled together through cluster connect 102. Each GPU 190 may be coupled to a local memory subsystem. In one embodiment, the local memory subsystem includes DRAM devices 198 and each GPU 190 is coupled to associated DRAM devices 198. The DRAM devices 198 may be coupled to a corresponding GPU 190 through an intervening subsystem such as a memory bus controller or the DRAM devices 198 may be coupled directly to a corresponding GPU 190. In one embodiment, DRAM devices 105 and DRAM devices 198 are selected to be substantially identical types of devices. In other embodiments, DRAM devices 105 and DRAM devices 198 are selected to be different types of devices.

In one embodiment, each GPU 190 includes a number of thread processors coupled to a cache 196. One or more thread processors may be configured to concurrently execute an instance of a thread program 194. A modem GPU may be configured to concurrently execute many thousands of instances of thread program 194 and retain execution state for yet more instances that may be scheduled for execution. In certain embodiments, different thread programs may be loaded into corresponding different GPUs or different GPU cores on the same GPU for concurrent execution.

GPUs 190 may be coupled to the cluster connect through any technically feasible interface. For example, GPUs 190 may be coupled to the cluster connect through a PCIe interface, a QPI (Intel Quick Path Interconnect) interface, or a memory bus interface.

Figure 2:
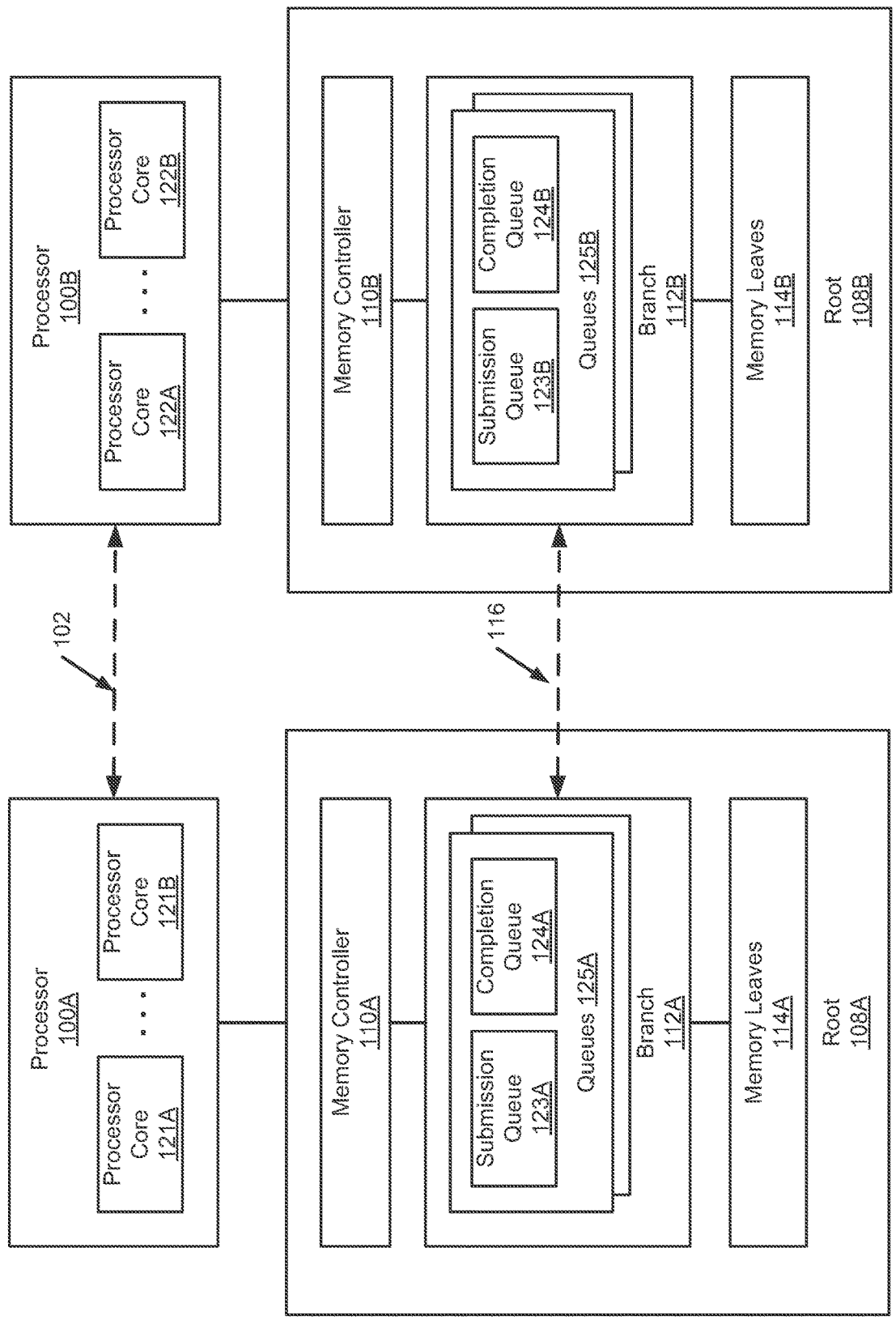
FIG. 2 is a block diagram illustrating a data processing system according to one embodiment of the invention.

FIG. 2 is a block diagram illustrating an example of a system architecture according to an alternatively embodiment. The system architecture as shown in FIG. 2 may be implemented as part of the system architecture as shown in FIG. 1A or FIG. 1B. Referring to FIG. 2, although there are only two processing units and their respective roots shown, more or fewer processing units and their roots can also be applicable. For the purpose of illustration, in order not to unnecessarily obscure embodiments of the invention, certain components having the same or similar functionalities are shown with the same or similar reference numbers. The corresponding description throughout this application with respect to the same or similar reference numbers are applicable herein without duplication.

In one embodiment, as described above, a data processing system includes a number of processing units or processors (e.g., CPUs) 100A-100B, a number of memory roots 108A-108B, and shared memory fabric or communication fabric 116 coupled to each of the memory roots. Each of the processing units 100A-100B include one or more processor cores (e.g., processor cores 121A-121B and 122A-122B), and each memory root is associated with one of the processing units. In this example, memory root 108A is associated with processor 100A and memory root 108B is associated with processor 100B. Each processor core may execute instructions of a particular thread, where a processor core is also referred to as a thread processor. Each of the memory roots 108A-108B includes one or more branches (e.g., branches 112A-112B) and a number of memory leaves (e.g., memory leaves 114A-114B). In this example, although there is only one branch for each processor, more branches can be implemented within the corresponding root. Each branch is associated with one or more memory leaves to provide access of the corresponding memory leaves. Each leaf includes one or more memory devices (e.g., solid state memory devices) to store data. The memory fabric 116 allows each of the branches 112A-112B to access (e.g., read and write) data stored in any of the memory leaves 114A-114B associated with any one of the remaining branches.

In one embodiment, each of branches 112A-112B includes one or more sets of queues (e.g., sets 123A and 124A, 123B and 124B) to buffer commands and data of accessing memory leaves, either locally or remotely. Each set of queues is associated with one of the processor cores of the corresponding processing unit. In one this example, the sets of queues 123A and 124A are associated with processor cores 121A-121B of processor 100A, one set for each of processor cores 121A-121B. Similarly, the sets of queues 123B and 124B are associated with processor cores 122A-122B of processor 100B, one set for each of processor cores 122A-122B. In one embodiment, each set of queues includes a submission queue or SQ (e.g., SQs 123A and 123B, also referred to as a command queue) and a completion queue or CQ (e.g., CQs 124A and 124B, also referred to as a done queue). A submission queue is used by an end point to submit a command to another end point over the shared memory fabric for a particular operation. A completion queue is used by an end point to place an acknowledgment or response to a command previously submitted via a submission queue.

For example, it is assumed the set of queues 125A is associated with processor core 121A. When processor core 121A attempts to access data stored in memory leaves 114A, it will place, via memory controller 110A, one or more commands in SQ 123A. Branch 112A then executes the commands from SQ 123A to perform the requested operation. Once the operation has been completed, branch 112A places a result (e.g., status, acknowledgement) of the operations in CQ 124A, which will in turn notify memory controller 110A and/or processor core 121A (e.g., via interrupt).

Similarly, when processor core 121A attempts to access data stored in memory leaves 114B, it places a command in SW 123A. Branch 112A then executes the command from SQ 123A. Branch 112A communicates with branch 112B via memory fabric 116 based on the command to request the operation to be performed at root 108B. In response branch 112B performs the requested operation. Once the operation has been completed, branch 112B communicates the result of the operation back to branch 112A. Branch 112A places the result in CQ 124A, which in turn will notify memory controller 110A and processor core 121A. Branches 112 and 112B may communicate with each other using a variety of signaling protocols or communication protocols (e.g., Ethernet protocols). Since there is one set of SQ and CQ for each of the processor cores, the above operations can be performed in parallel for multiple processor cores executing multiple threads.

Figure 3A:
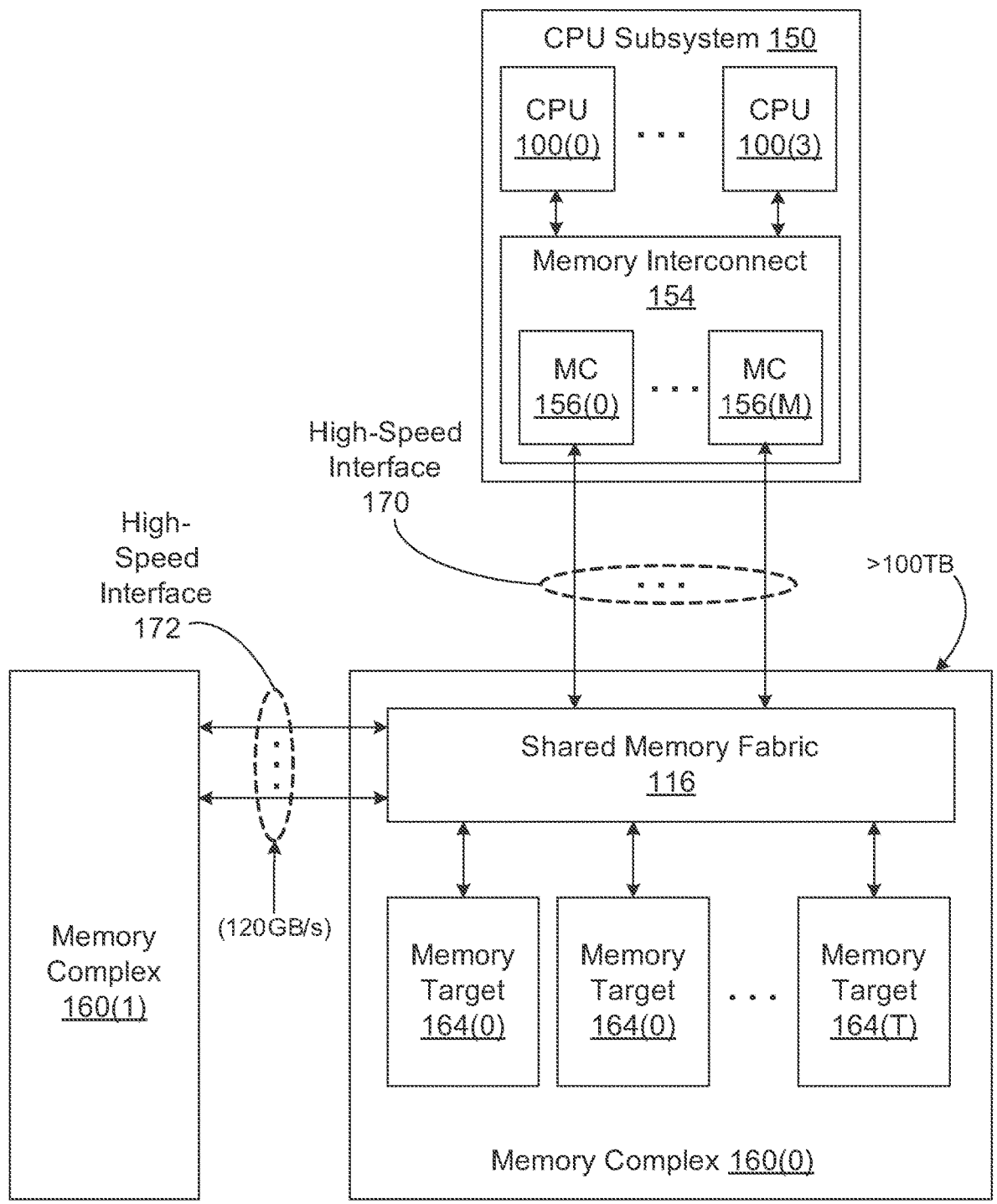
FIGS. 3A and 3B illustrate an exemplary system architecture of a data processing system according to some embodiments of the invention.

FIG. 3A is a block diagram illustrating a data processing system according to another embodiment of the invention. FIG. 3A illustrates a conceptual implementation comprising a single CPU subsystem 150, according to one embodiment. CPU subsystem 150 may be implemented as a rack-mounted server box. As shown, CPU subsystem 150 includes two or more CPUs 100 coupled together locally through a memory interconnect 154. For clarity, local memory and other components of the CPU subsystem are not shown. Memory interconnect 154 includes memory controller (Mc) 156(0) through MC 156(M). Each MC 156 may be coupled to a CPU 100 and may present memory resources to the CPUs 100. The memory resources may include memory blocks, memory pages, or groups thereof. A high-speed interface 170 is coupled between the MCs 156 of the CPU subsystem and a shared memory fabric 116 within a memory complex 160(0). High-speed interface 170 is configured to transmit data between memory controllers 156 and shared memory fabric 116. The data may include memory access requests (e.g., read and write access requests) from the CPU subsystem to target memory resources. High-speed interface 170 may include multiple independent, high-speed data links. High-speed interface 170 may be implemented using any technically feasible data transmission technology. In one embodiment, high-speed interface 170 includes a number of 10 GB Ethernet links, 40 GB Ethernet links, or any combination thereof.

In one embodiment, shared memory fabric 116 is configured to receive memory access requests from high-speed interface 170 and forward the requests to corresponding memory targets 164. For example, a CPU may generate a write request and post the write request to a memory controller 156. The memory controller may transmit the write request through high-speed interface 170 to shared memory fabric 116. Shared memory fabric 116 then forwards the write request to an appropriate memory target 164. Sequential chunks of memory (e.g. aligned cache lines) associated with a given CPU may be mapped to sequential units of storage within memory targets 164(0) through 164(T). Consequentially, when a given thread executing on one CPU core writes a contiguous range of memory, associated chunks of memory are distributed over the memory targets 164 rather than concentrated within on memory target. Spreading out each address range associated with each CPU core in this way statistically distributes accesses across interconnection and memory resources and reduces the probability of a resource contention where two or more CPUs are attempting to access a common resource along the path from memory interconnect 154 to stored data within memory targets 164. Shared memory fabric 116 is depicted here conceptually as a single module; however, the shared memory fabric may be implemented as a data network, such as a distributed mesh, a cross-bar, tree, and the like. Memory targets 164 may include branches 112, leaves 114, or a combination thereof.

A second memory complex 160(1) may be coupled to memory complex 160(0) through high-speed interface 172. In one embodiment, high-speed interface 172 is configured to transmit 120 GB/s of data in each direction, and may be implemented as twelve 10 GB Ethernet links or three 40 GB Ethernet links. Memory complex 160(1) may be configured to mirror operations of memory complex 160(0) or participate in data migration between memory complex 160(0) and 160(1).

Figure 3B:
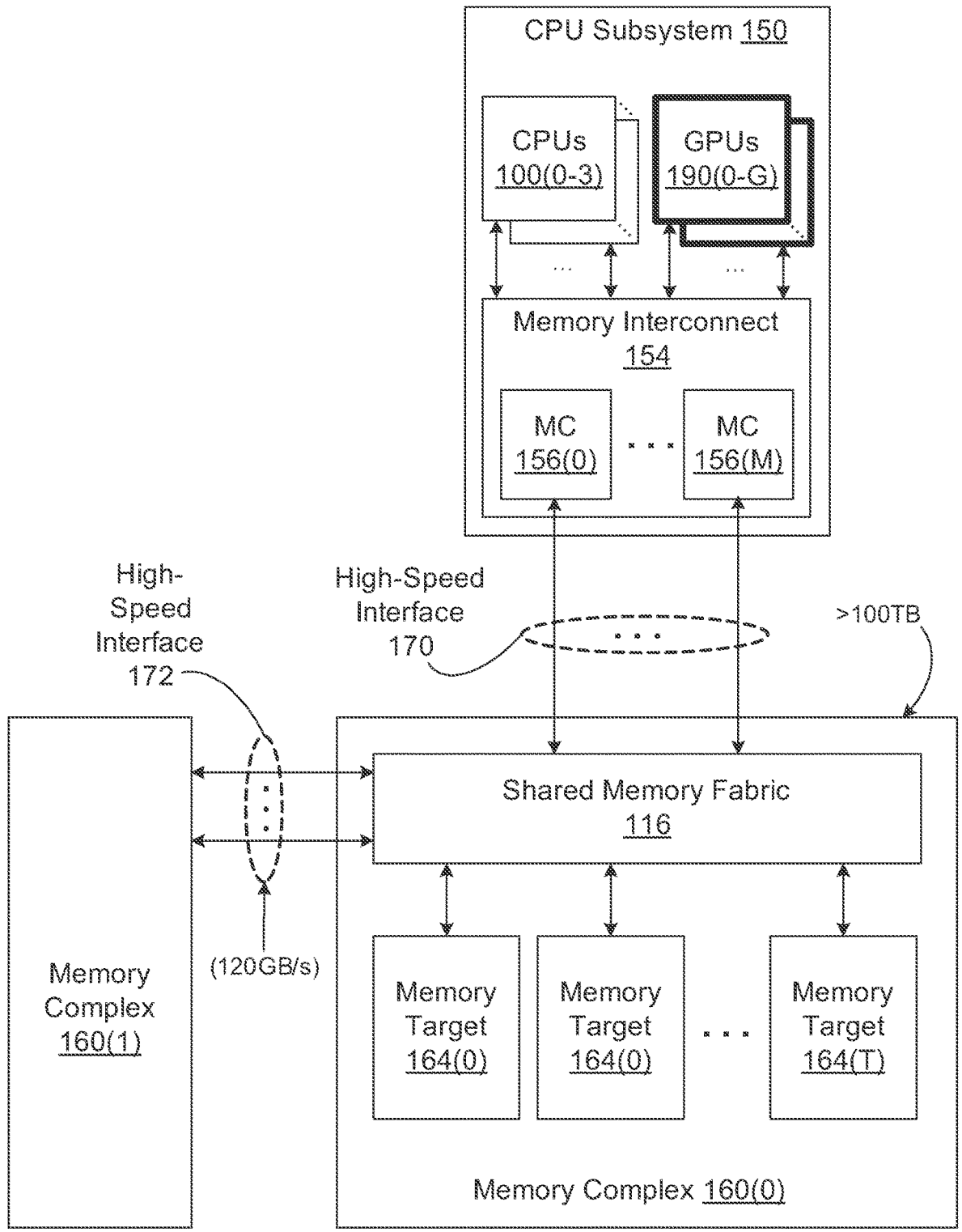

FIG. 3B is a block diagram illustrating a data processing system according to another embodiment of the invention. FIG. 3B illustrates a conceptual implementation comprising a single CPU subsystem 150 configured to include GPU resources, according to one embodiment. As shown, one or more CPUs 100 may be coupled to memory interconnect 154. Furthermore, one or more GPUs 190 are coupled to memory interconnect 154. The CPUs and the GPUs may include local memory resources such as DRAM devices 105 and 198.

Figure 4A:
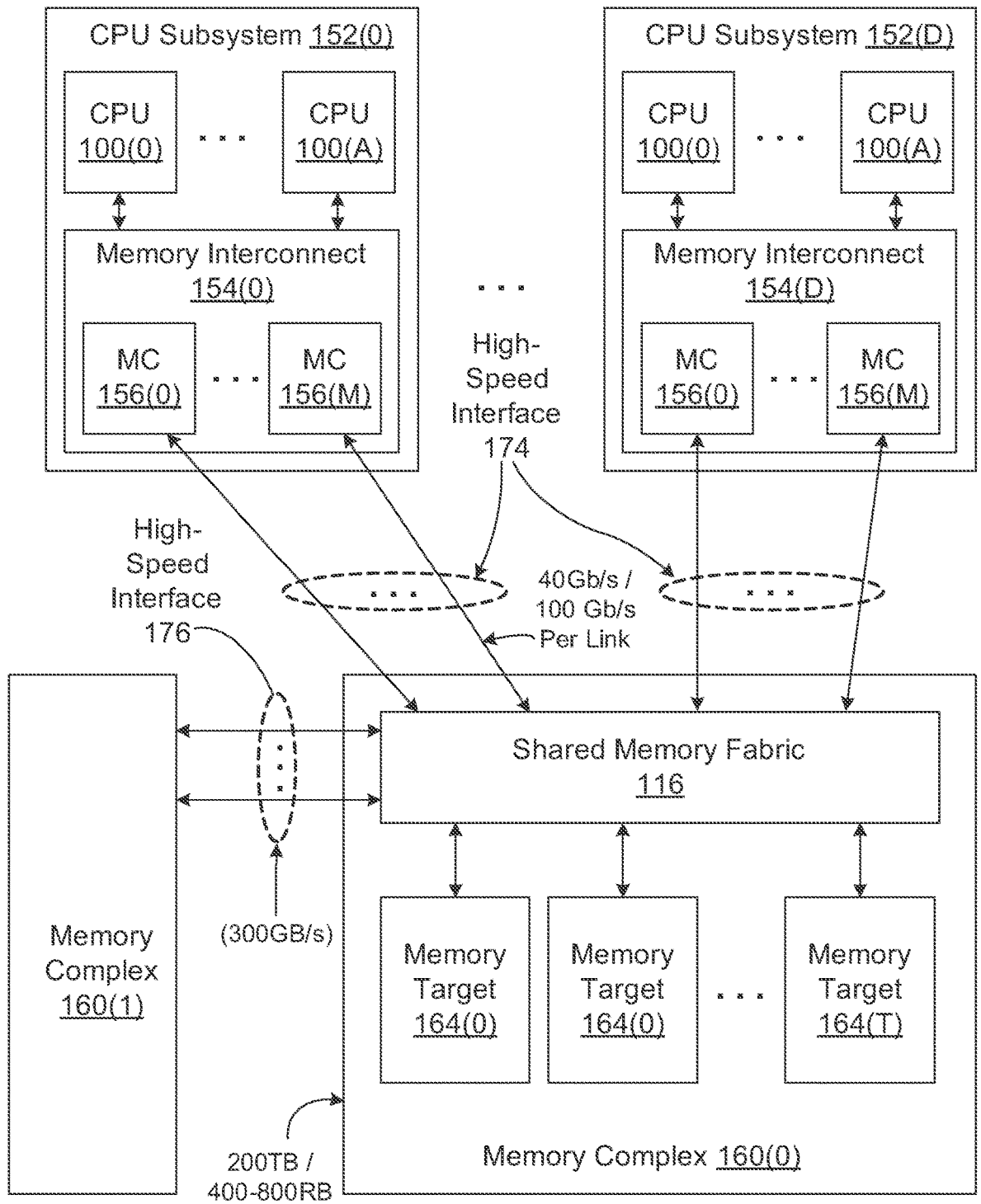
FIGS. 4A and 4B illustrate an exemplary system architecture of a data processing system according to some embodiments of the invention.

FIG. 4A is a block diagram illustrating a data processing system according to another embodiment of the invention. FIG. 4A illustrates a conceptual implementation comprising multiple CPU subsystems 152, according to one embodiment. The multiple CPU subsystems 152 may be implemented as a rack mounted server boxes. As shown, CPU subsystems 152 include two or more CPUs 100 coupled together locally through memory interconnect 154. For clarity, local memory and other components of the CPU subsystem are not shown. A high-speed interface 174 is coupled between the CPU subsystem and shared memory fabric 116 within a memory complex 160(0). High-speed interface 174 may include multiple, independent, high-speed data links. In one embodiment, high-speed interface 174 includes a number of 40 GB or 100 GB Ethernet links. Furthermore, an access request from a CPU 100 to a memory target 164 is transmitted and acknowledged through the same Ethernet link.

Memory complex 160(1) may be coupled to memory complex 160(0) through high-speed interface 176. In one embodiment, high-speed interface 176 is configured to transmit 300 GB/s of data in each direction, and may be implemented as three 100 GB Ethernet links, or a combination of lower-rate Ethernet links.

The conceptual implementation shown here in FIG. 4A is similar to that of FIG. 1A and FIG. 3A, except that CPU subsystems 152 may provide scale-out configurability. For example, the system may be implemented to provide a multi-processing computation platform using multiple independent CPU subsystems 152, each comprising a server chassis coupled to shared memory fabric 116.

Figure 4B:
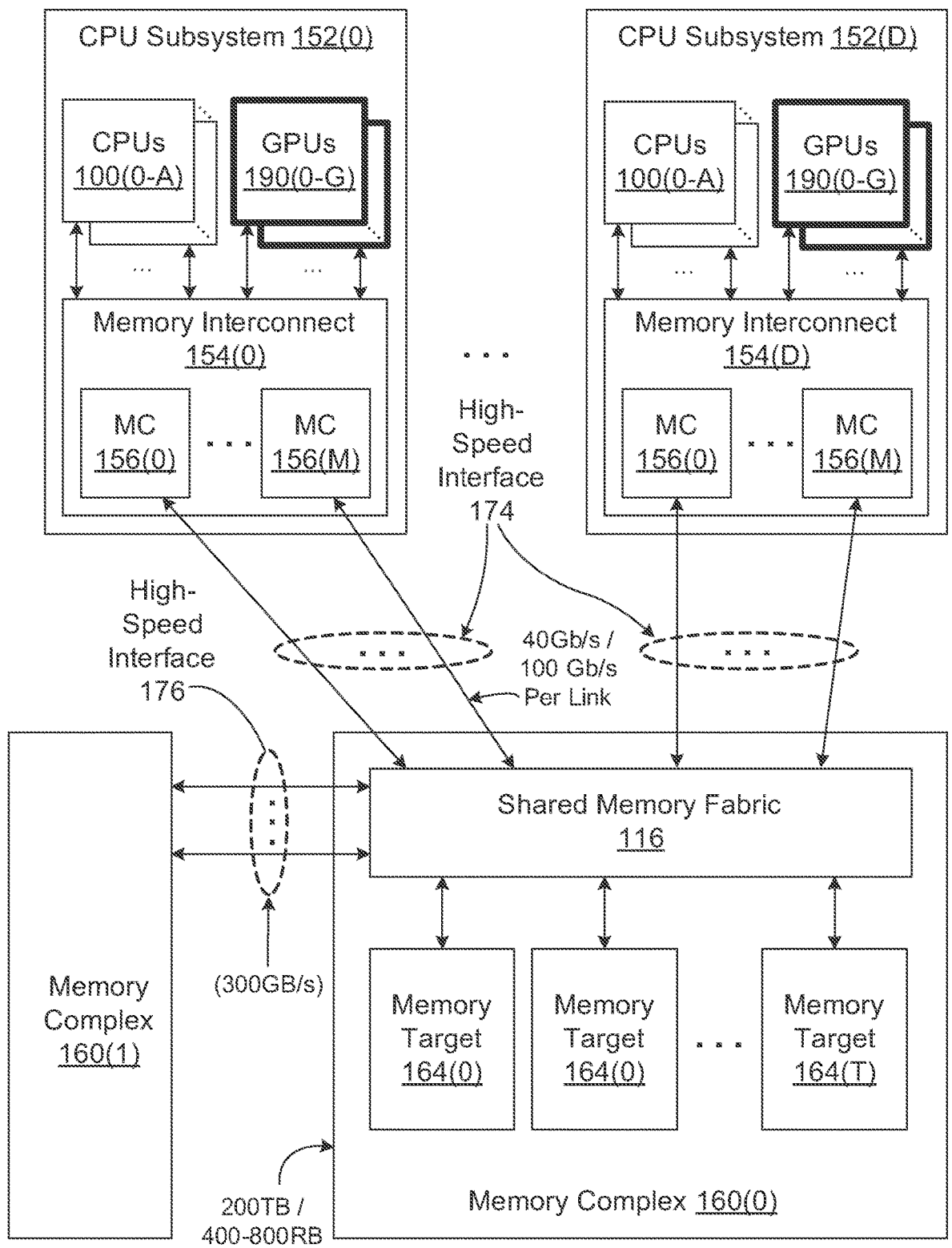

FIG. 4B is a block diagram illustrating a data processing system according to another embodiment of the invention. FIG. 4B illustrates a conceptual implementation comprising multiple CPU subsystems 152 configured to include GPU resources, according to one embodiment. As shown, one or more CPUs 100 may be coupled to memory interconnect 154. Furthermore, one or more GPUs 190 are coupled to memory interconnect 154. The CPUs and the GPUs may include local memory resources such as DRAM devices 105, 198.

Embodiments of the present invention can be built in a variety of configurations that are suited to particular usage patterns. A particular configuration may be optimized for a large number of specific uses, such as these large memory consumption applications: Business Intelligence, Business Analytics, Geo-Seismic, Medical Imaging, Social Networking, Fraud Detection, Patient Management and Database and Data Warehouse Extract, Transform and Load (ETL), and protein-protein modeling.

In one embodiment, a root memory controller connects to a complex of interconnected CPUs, each consisting of multiple cores, and drives a hierarchy of branches and leaves. Observe that each branch is attached either to another branch or a number of leaves or a mix of both. Put another way, the memory controllers and branches may be interconnected. The interconnection may include the implementation of data coherence protocols utilized with and without multiple copies of the data distributed across local or remote leaves.

A leaf may include flash memory or other solid-state or digital memory. In particular, there may be 1024 or more memory chips attached to a single root (e.g., FPGA(s) or ASIC(s)) through branches. Each CPU complex can be connected to eight or more roots. Consequently, if this figure were accurate and to scale; the number of solid-state memory leaves would overwhelm the figure. In this architecture the CPUs have thousands of memory targets that may be accessed in parallel.

Embodiments of System Architectures

Figure 5:
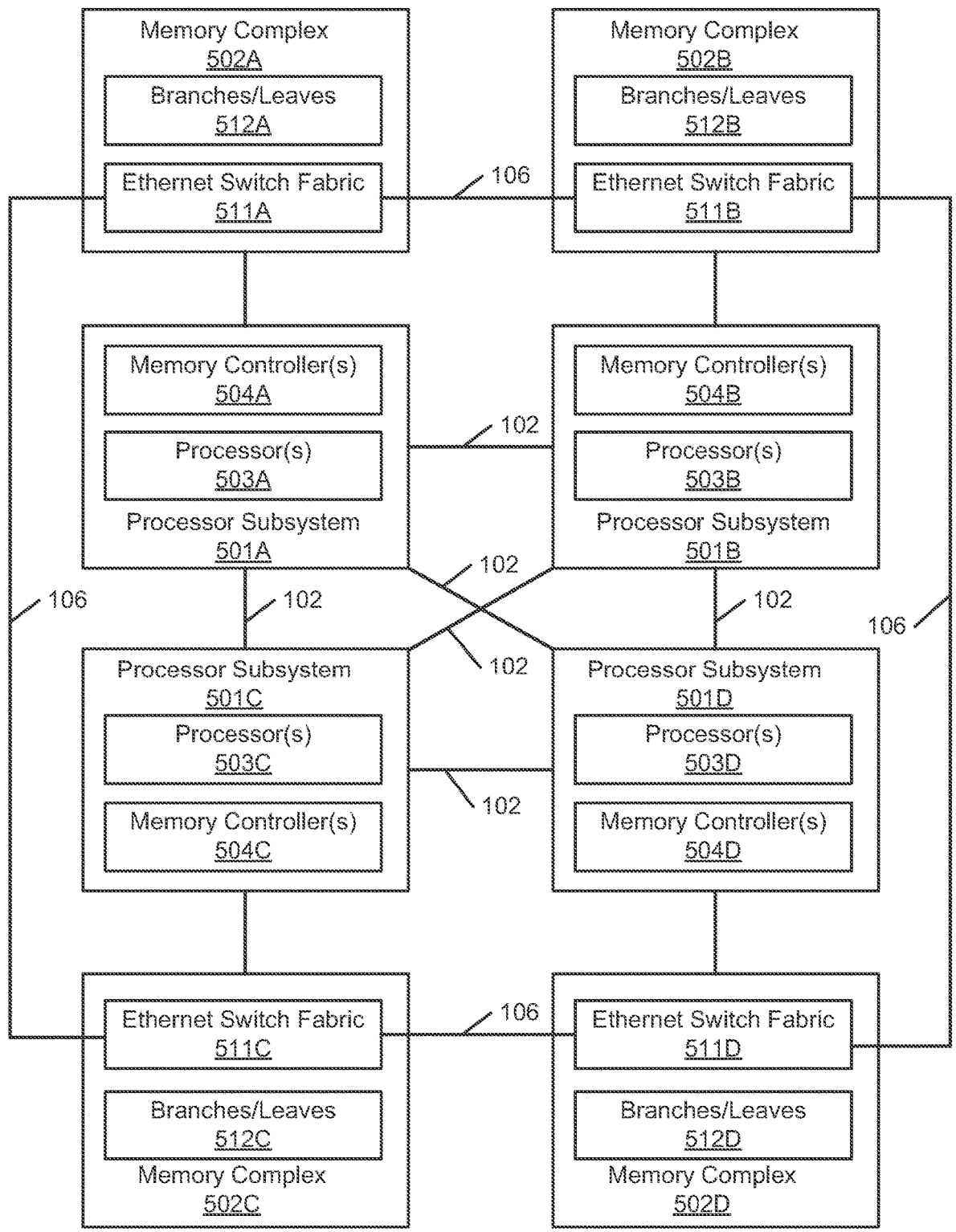
FIG. 5 is a block diagram illustrating a data processing system according to another embodiment of the invention.

FIG. 5 is a block diagram illustrating a data processing system according to another embodiment of the invention. In one embodiment, system 500 includes a number of central processing unit (CPU) subsystems, a number of memory complexes, and an Ethernet switch fabric coupled to each of the CPU subsystems and memory complexes. Each CPU subsystem includes one or more CPUs and one or more memory controllers corresponding to the CPUs. Each memory complex corresponds to one of the CPU subsystems. Each memory complex includes one or more branches and an array of memory leaves to store data. Each of the branches is coupled to one or more of the memory leaves and provides access to the data stored in the memory leaves. The Ethernet switch fabric is coupled to each of the memory controllers of the CPU subsystems and each of the branches of the memory complexes. Each memory controller can communicate with each of the branches via the Ethernet switch fabric over the Ethernet to access data stored in any of the memory leaves associated with the corresponding branch.

Referring to FIG. 5, system 500 includes a number of processor subsystems 501A-501D (collectively referred to as processor subsystems 501) and a number of memory complexes 502A-502D (collectively referred to as memory complexes 502) corresponding to processor subsystems 501A-501D respectively. Although there are four processor subsystems and memory complexes shown herein, more or fewer processor subsystems and memory complexes may be applied here. Processor subsystems 501 may represent any of CPU subsystems 152. Processors 502 may represent any of CPUs 100 and/or GPUs 190 and memory controllers 504 may represent any of memory controllers 110 or 154. Branches/leaves 512 may represent any of branches 112 and leaves 114 or memory targets 164.

Each of processor subsystems 501 may represent any of the CPU subsystems described above. Each processor subsystem may include one or more processors (e.g., processors 503A-503D, collectively referred to as processors 503) and each processor may include one or more processor cores. Each processor subsystem further includes a memory controller for one of the processors included therein such as memory controllers 504A-504D (collectively referred to as memory controllers 504). Each of processor subsystems 501 is coupled to any of remaining ones of processor subsystems 501 via a processor interconnect 102 (e.g., QPI interconnect).

Each of memory complexes 502 includes or is coupled to an Ethernet switch fabric such as Ethernet switch fabrics 211A-211D, collectively referred to as Ethernet switch fabrics 211. Ethernet switch fabrics 211A-211D may be the single Ethernet switch fabric that is coupled to each of the memory complexes 502, forming a shared memory fabric or an Ethernet 116. Each of memory complexes 502 further includes one or more branches and memory leaves such as branches/memory leaves 512A-512D (collectively referred to as branches/memory leaves 512). With shared memory fabric or Ethernet 116, each of memory controllers 504 and each of branches 512 can communicate with any one of the remaining ones of memory controllers 504 and each of branches 512.

Alternatively, each of memory controllers 504 can communicate with any one of the remaining memory controllers via processor interconnect 102. In one embodiment, each memory controller may determine a best route, either via processor interconnect 102 or via Ethernet fabric 106, to communicate with a remote counterpart (e.g., a remote memory controller or a remote branch), dependent upon the traffic congestion on the paths or routes. For example, when memory controller 504C wishes to access data stored in memory complex 502B, memory controller 504C can communicates with branches/memory leaves 512B via Ethernet switches 511B-511C over shared memory fabric/Ethernet 106 using Ethernet protocols. Alternatively, memory controller 504C can go through processor interconnect 102 to reach processor subsystem 501B which in turn reaches memory complex 502B.

Figure 6:
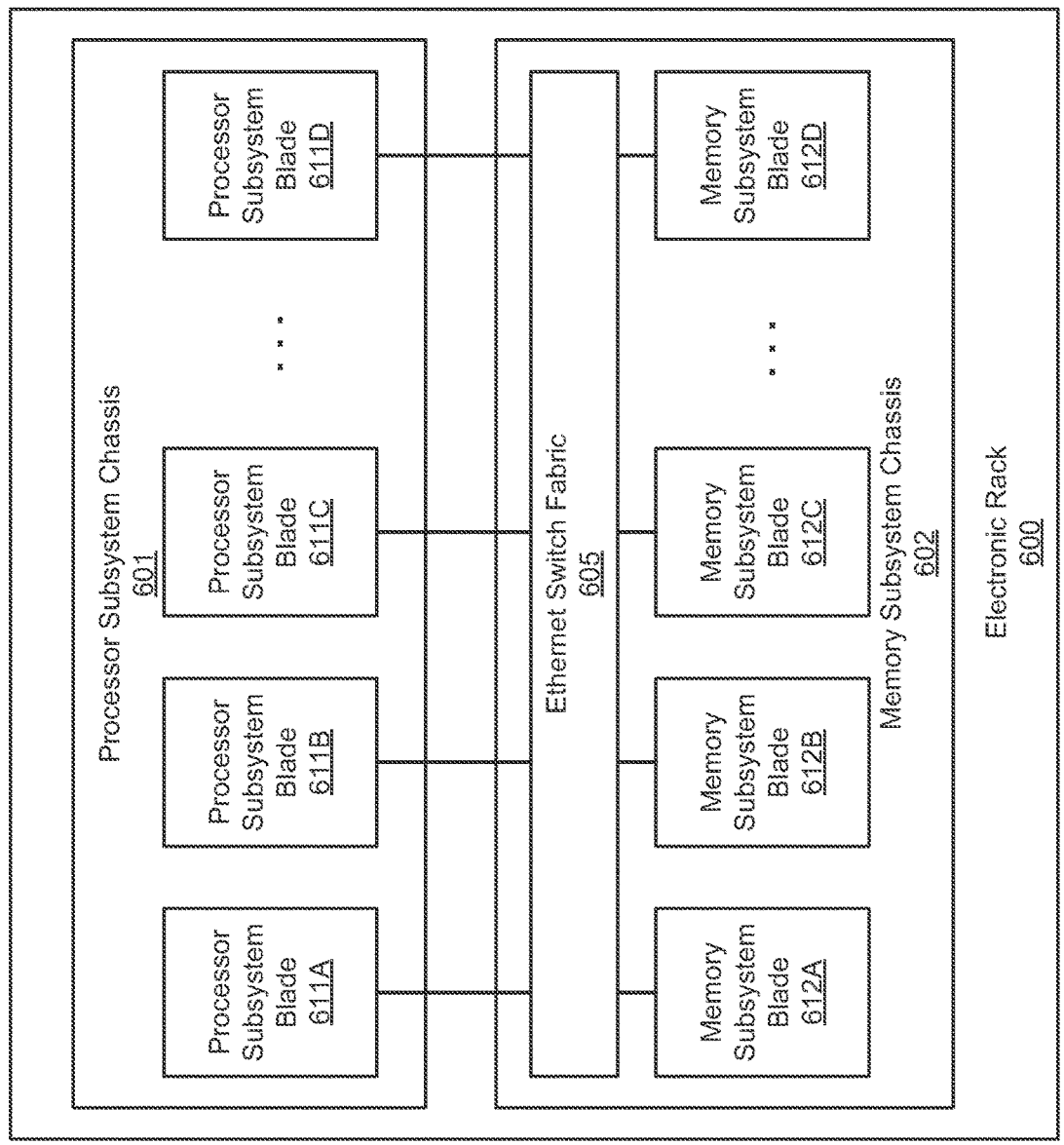
FIG. 6 is a block diagram illustrating an electronic rack configuration according to one embodiment of the invention.

FIG. 6 is a block diagram illustrating an electronic rack configuration according to one embodiment of the invention. Referring to FIG. 6, electronic rack 600 includes a processor subsystem chassis 601 and a memory subsystem chassis 602. More processor subsystems and/or memory subsystems can be contained in electronic rack 600. In one embodiment, processor subsystem chassis 601 includes a number of processor subsystem slots to receive a number of processor subsystem blades 611A-611D (collectively referred to as processor subsystem blades 611). Each of processor subsystem blades 611 may represent any one or more of processor subsystems 501 of FIG. 5. Each of processor subsystem blade may be plugged into a back plane having a mesh of processor interconnects, such that all processor subsystem blades 611 are coupled to each other via a processor interconnect (e.g., QPI).

Memory subsystem chassis 602 includes a number of memory subsystem slots to receive a number of memory subsystem blades 612A-612D (collectively referred to as memory subsystem blades 612) and one or more Ethernet switches 605. Each of memory subsystem blades 612 may represent any one or more of memory complexes 502 of FIG. 5. In one embodiment, each of memory subsystem blades 612 is coupled to Ethernet switch 605. Ethernet switch 605 may be implemented as part of a back plane of memory subsystem chassis to allow each memory subsystem blade to be plugged into Ethernet switch 605. Alternatively, each of memory subsystem blade is coupled to Ethernet switch 605 via a respective Ethernet cable. Each of processor subsystem blades 611 can be coupled to Ethernet switch 605 via a corresponding Ethernet cable.

Each memory system may include roots, branches and leaves, as described above. In one embodiment, there are four roots sometimes referred to herein as Memory Modules (MMs). Conceptually, one or more roots can replace one or more corresponding memory riser cards in the computer's chassis. Each root may connect to a distribution network, providing an interface to a number of branches, each of which connects to a number of leaves.

Figure 7:
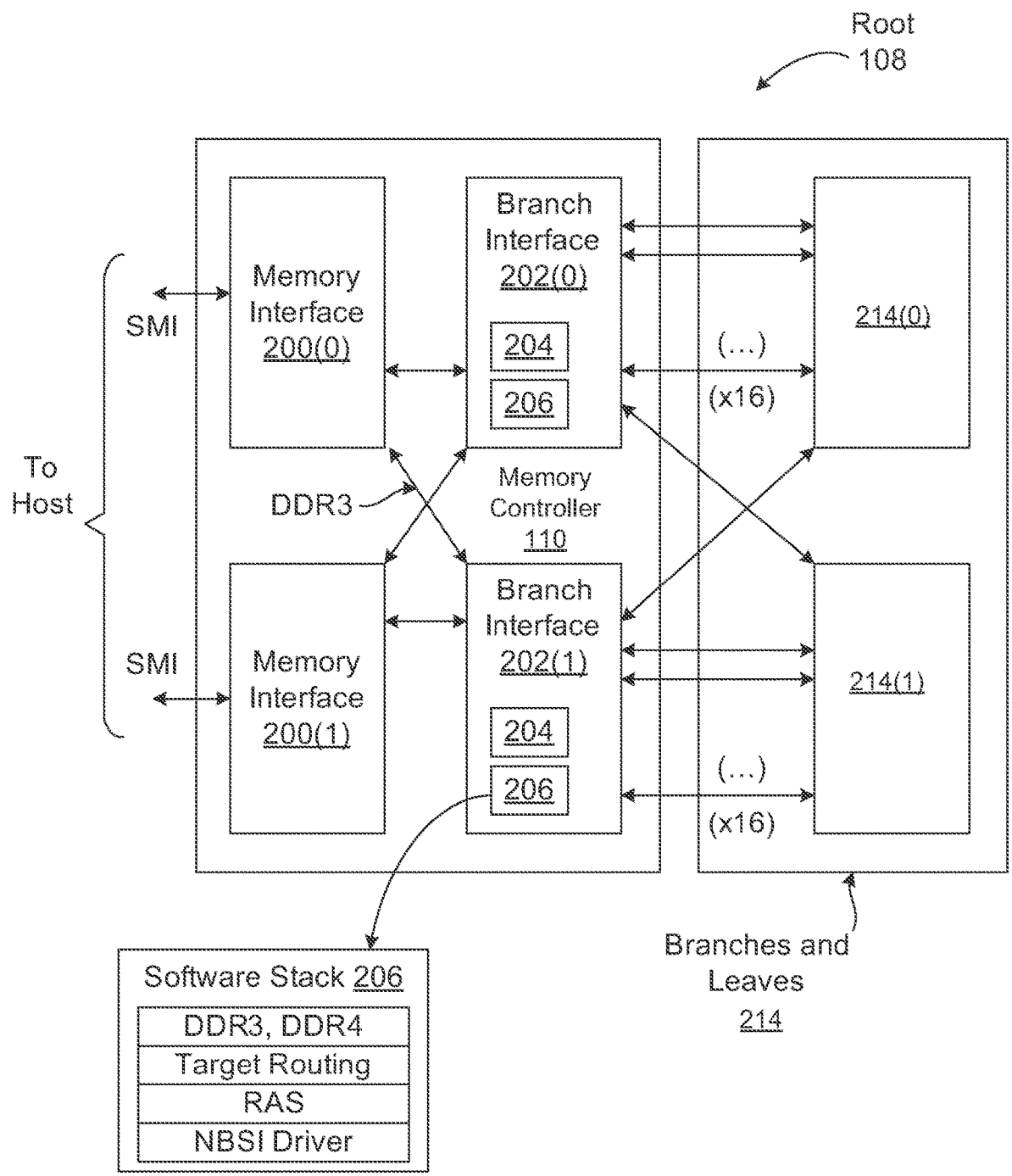
FIG. 7 shows an example of a configuration of a data processing system according to one embodiment of the invention.

FIG. 7 shows an example of a configuration of a data processing system according to one embodiment of the invention. Referring to FIG. 7, a root includes two memory buffer controllers, two memory master controllers, sixteen branches, and sixteen leaves with 16 Flash devices per leaf. Each root has a total of 8 TB of flash memory for a system total of 32 TB-half of which is available to user applications and half of which is allocated to redundancy and system use. Alternatively, a root might be connected to a CPU Complex via a PCIe or DDR4 interface. While these interfaces behave somewhat differently, the application software is able to utilize the many leaf chips in a parallel fashion in all cases.

In this embodiment, root 108 includes memory controller 110. Memory controller 110 includes one or more memory interface controllers 200(0) and 200(1) (collectively referred to as memory interface controllers 200) and one or more branch interface controllers 202(0) and 202(1), collectively referred to as branch interfaces controllers 202. Each of the branch interface controllers 202 includes cache or buffer 204 to buffer or cache data. Each of the branch interface controllers further executes or hosts a software stack such as software stacks 206 for performing a variety of operations such as memory accesses and routing. Note that each of memory interface controllers 200 can communicate with any of branch interface controllers 202, for example, via a DDR3 interface.

Each of memory interface controllers 200 is connected to an inter-processor data distribution network in which all CPUs have access to all memory. Associated memory may be implemented as a multi-rooted tree composed of branches and leaves as described in detail below. Associated computing resources may be implemented as a shared-memory multiprocessor, which may be of a uniform or non-uniform type.

In an alternatively embodiment, memory interfaces 200 may be implemented as a part of one or more memory controllers. Branch interfaces 202 may be implemented as a part of one or more branches, where each of memory controllers 200 is coupled to each of branches 202. Each branch is coupled one or more memory leaves 214(0)-214(1), collectively referred to as memory leaves 214.

Figure 8:
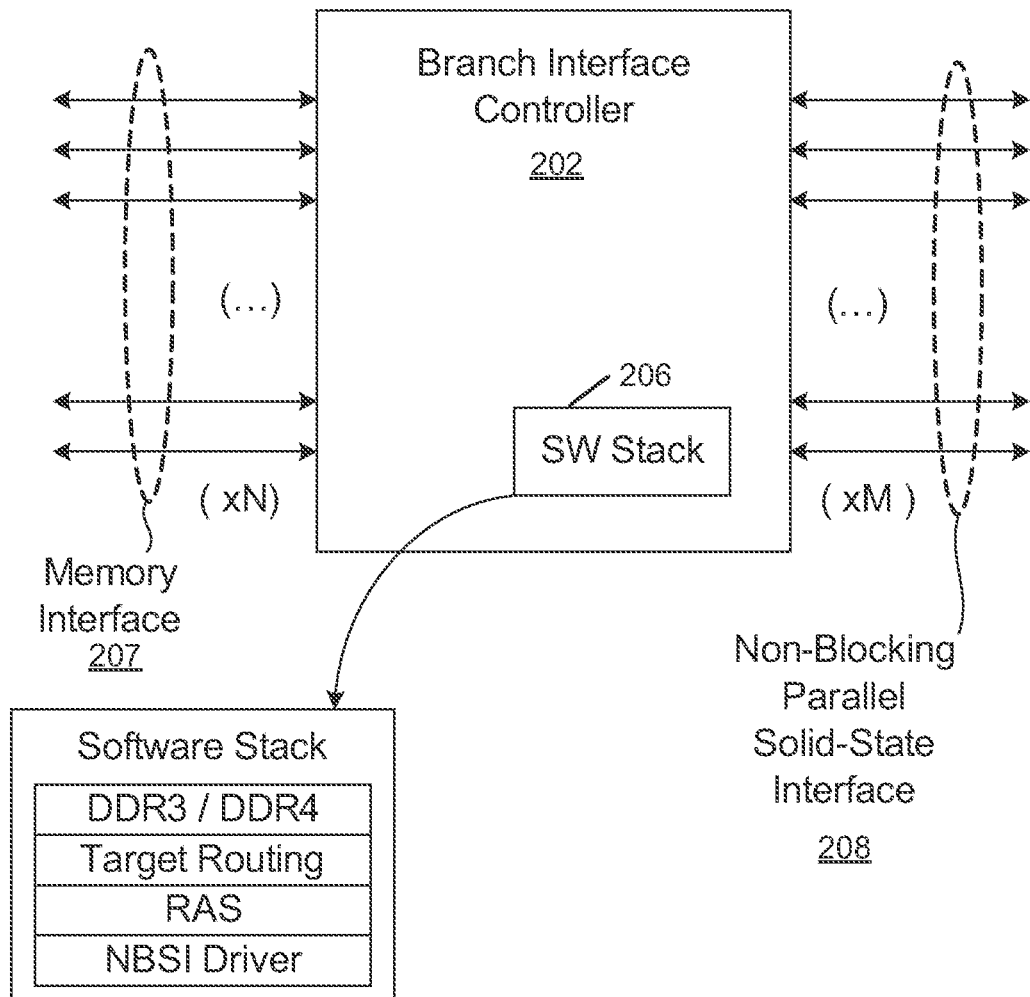
FIG. 8 is a block diagram illustrating a branch interface controller according to one embodiment of the invention.

In one embodiment, root 108 may be implemented with FPGAs that provide branch interface control. For example, an FPGA or an ASIC may execute software stack 206 that supports DDR3 memory accesses, target routing, Reliability Availability Serviceability (RAS) operations and various drivers e.g., a Non-Blocking Parallel Solid State Interface (NBPSI) as described in detail below. These operations may be distributed across many chips and subdivided into local processing steps, as shown in FIG. 8. Referring now to FIG. 8, branch interface controller 202 includes a set of memory interfaces 207 coupled to one or more memory interface controllers 200 and a set of non-blocking parallel solid state interfaces 208 to be coupled to an array of memory leaves. The non-blocking parallel solid state interfaces 208 allow a large amount of IO requests to access the memory leaves in parallel, without blocking each other.

In one embodiment, a Memory Master Controller (MMC) and Memory Slave Controller (MSC) devices are implemented with dedicated hardware. A root may represent an MMC, while a branch may represent an MSC and a leaf is a solid-state memory device. For example, Altera Stratix V FPGAs may be used for both the MMC and MSC. In this case, each FPGA has 48 serial links operating at 12.8 Gb/s, and three links from each MMC go to each of sixteen MSC devices. Each MSC in turn connects to 16 leaves, each a solid-state memory device, for example a 32 GB Single Level Cell (SLC) NAND Flash device. Many other implementations, including implementations in which the components and their interconnections are changing in real-time, are possible.

Figure 9:
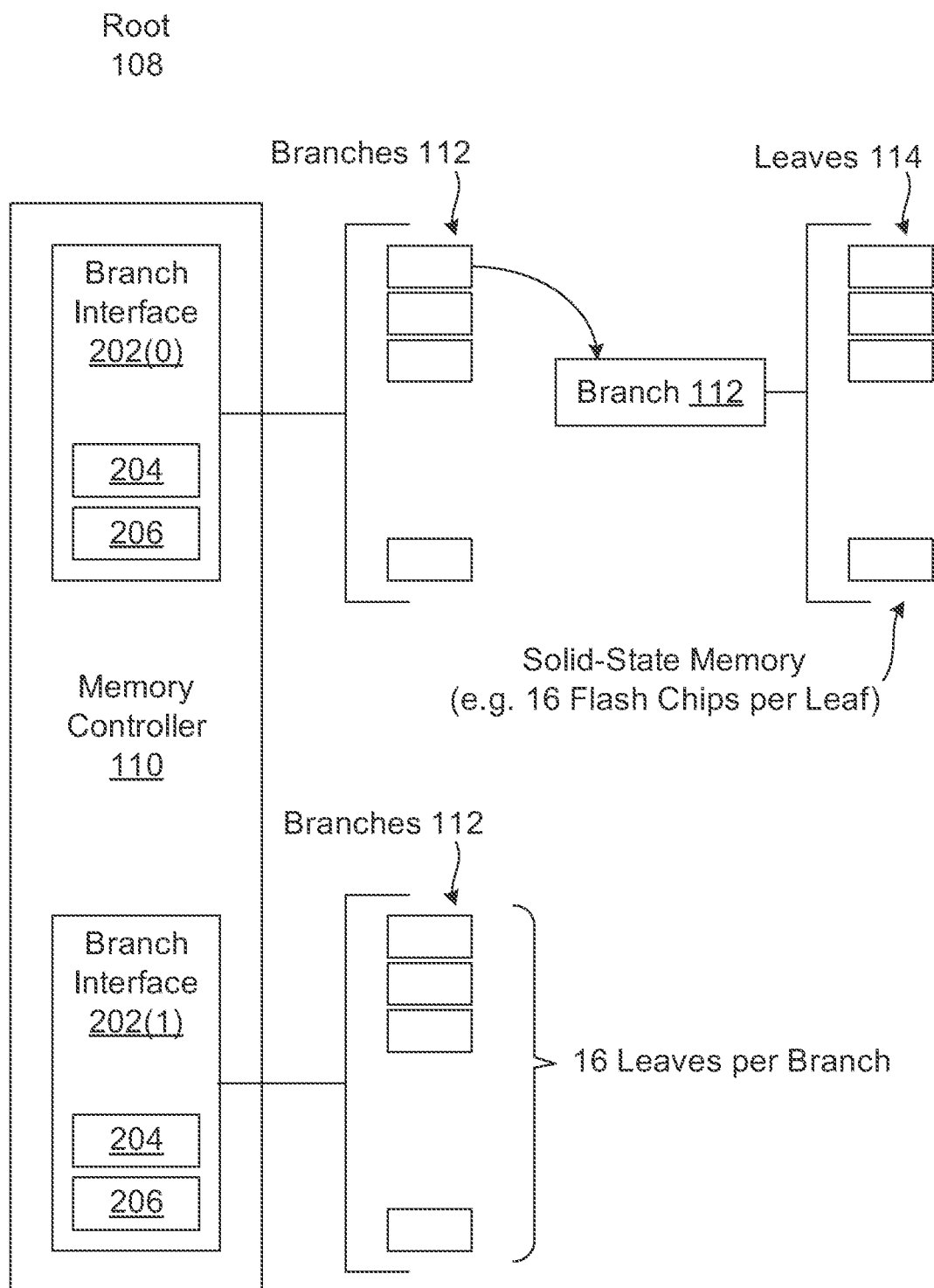
FIG. 9 is a block diagram illustrating an example of a root configuration according to one embodiment of the invention.

FIG. 9 is a block diagram illustrating an example of a root configuration according to one embodiment of the invention. Referring to FIG. 9, root 108 includes one or more memory controllers 110. Each memory controller includes one or more branch interface controllers 202. Each of branch interface controller is coupled to one or more branches 112. In one embodiment, each branch interface controller is coupled to 16 branches. Each branch is coupled to and manages one or more memory leaves 114. In one embodiment, each branch is coupled to 16 memory leaves. Each memory leaf includes a number of solid state memory devices (e.g., flash memory chips). In one embodiment, each memory leaf includes 16 solid state memory devices.

Figure 10:
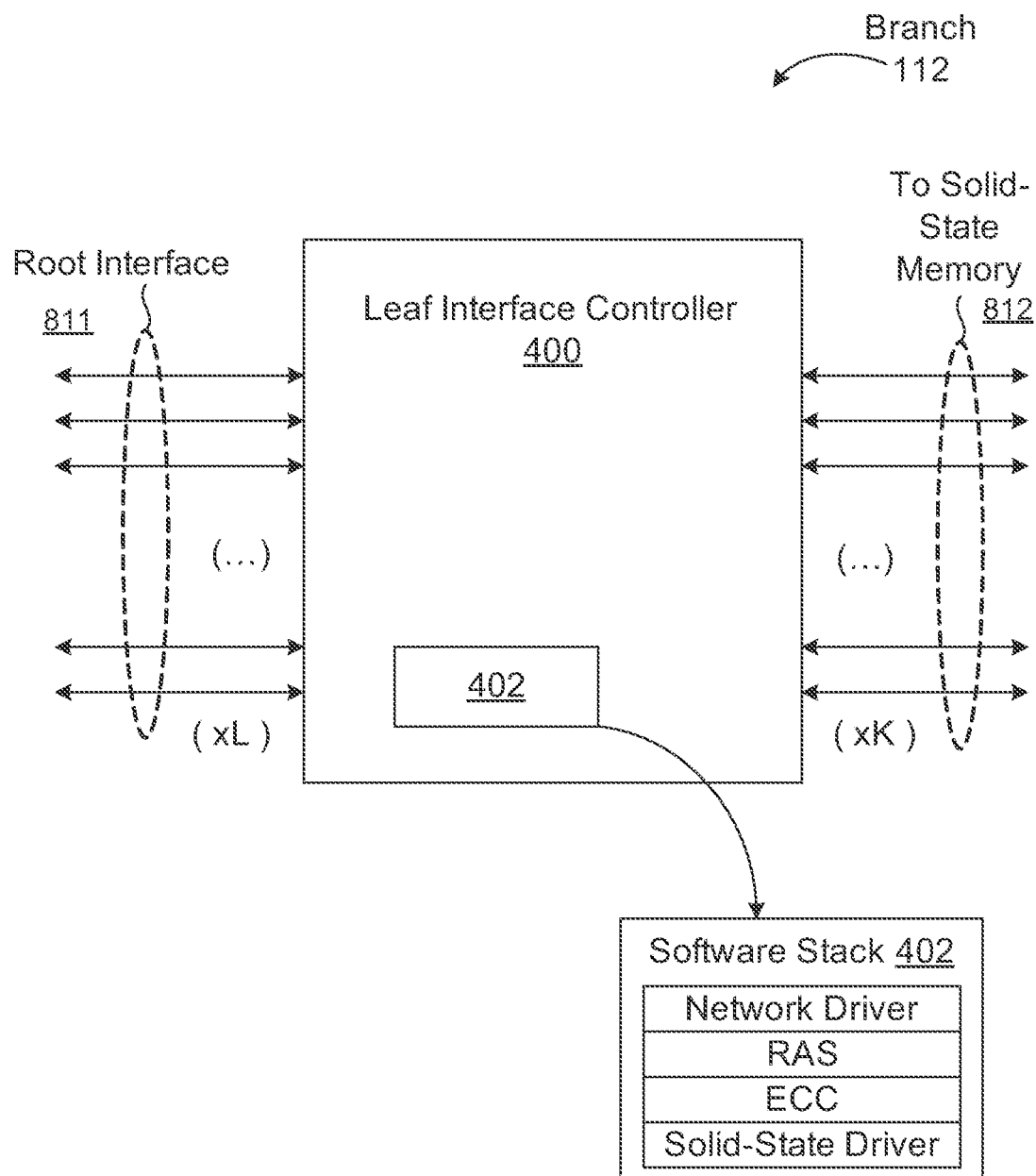
FIG. 10 is a block diagram illustrating an example of a branch according to one embodiment of the invention.

FIG. 10 is a block diagram illustrating an example of a branch according to one embodiment of the invention. Referring to FIG. 10, in one embodiment, a branch such as branches 112 is a component with a number of leaves attached via a corresponding leaf interface controller such as leaf interface controller 400, where each leaf contains one or more flash memory chips. The memory branch 112 executes a software stack 402, which may include network drivers, RAS, error correction codes (ECC), database engines, data compression engines, encryption engines and solid-state drivers. These components provide a way of performing computational tasks on the data stored in the leaves without moving it to another processing unit.

In an alternative embodiment, a memory branch as a parent branch is a component with a number of further or child branches organized as a hierarchy of branch layers, and leaves attached where each branch executes the same or a different software stack. In heterogeneous systems, each branch may be aware of its neighbors and cooperate in the implementation of the network drivers, RAS, error correction codes, database engines, data compression engines and solid-state drivers. Branches finally end in leaves. Each leaf is a device that acts to read and write data pages into a physical memory device, such as a non-volatile store. The leaf may be implemented in many forms using any technically feasible memory technology.

In one embodiment, approximately half of the memory system stores data and another half of the memory space supports rapid data access. In another embodiment, a fraction of the physical memory is reserved in order to provide adequate performance. In a further embodiment, the memory distributes data across individual leaves using specially designed methods that minimize inefficiencies. In another embodiment, the memory components themselves may be composed of individual components that together produce the desired behavior.

In a further embodiment, a segmented system with isolated domains that remain operative in the event of the failure of individual domains. These components are interdependent. In order for the whole system to function efficiently, the interconnected components depend on each other for correct functioning and timely completion of each other's work.

In one embodiment a virtual memory system is used to keep track of two sources of data from which a new file may be written. If an application program accesses a portion of an original file that the new file has not copied yet, this mechanism makes a copy on use (access). This way, large original files can be slowly migrated as new files without requiring large, slow copy operations. An advanced topic includes leaving both an original file and new instance of the file in place on reads, and just making a copy of the original file in response to high usage or in response to writes. This technique should implement a detection and recovery algorithm for when the files change enough or at a sufficiently rapid rate as to disallow continuation of this mechanism.

In one embodiment a mechanism is implemented to allocate a buffer using a memory device as a backing store, having a file the application wants to read on the same memory device and using copy-on-write (COW) for reads from the real file into space associated with the allocated buffer, instead of making a copy at read time. In a preferred implementation, a virtual memory system is configured to can keep track of two backing files depending on whether the data from the original file has only been read or has been modified.

Embodiments of Memory Subsystem with Replication Interface

Figure 11:
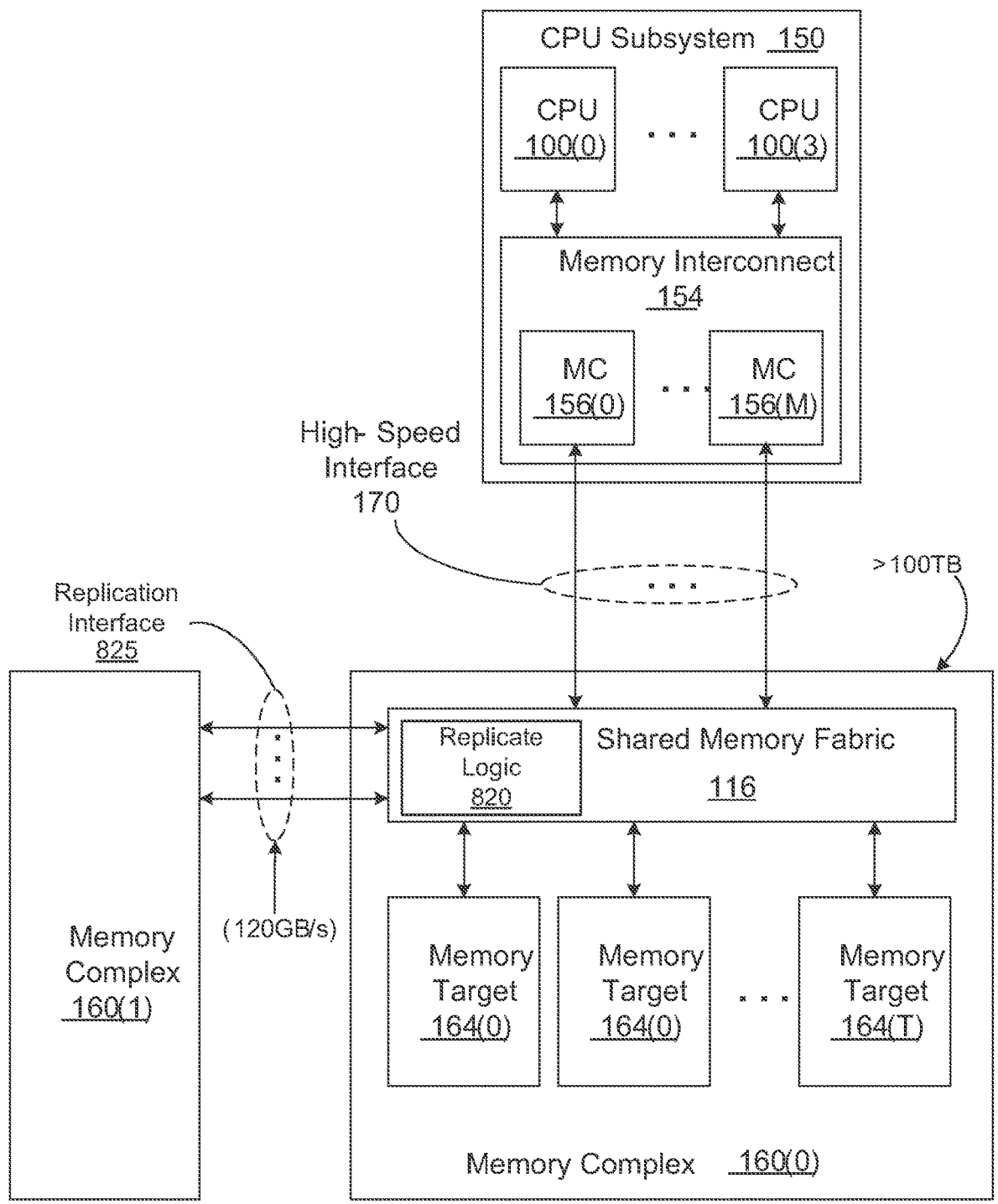
FIG. 11 is a block diagram illustrating a data processing system according to another embodiment of the invention.

FIG. 11 is a block diagram illustrating a data processing system according to another embodiment of the invention. In one embodiment, a data processing system includes one or more CPU subsystems and a number of memory complexes. Each CPU subsystem includes one or more CPUs and one or more memory controllers corresponding to the CPUs. Each of the memory complexes is associated with one of the CPU subsystems. Each memory complex includes one or more branches, a number of memory leaves to store data, and a replication interface. Each branch manages one or more memory leaves and each memory leaf includes one or more memory devices such as solid state memory devices. The replication interface automatically replicates data received from one of the CPU subsystems to another one of the memory complexes, where the data is stored in one of the memory leaves.

Referring to FIG. 11, in one embodiment, at least one memory complex, in this example, memory complex 160(0) includes replication logic and a replication interface to replicate data received from CPU subsystem 150 from memory complex 160(0) to another memory complex such as memory complex 160(1). In this particular embodiment, shared memory fabric or Ethernet switch 116 includes replication logic 820 that is configured to replicate data received from a data source (e.g., CPU subsystem 150 or another component) to memory complex 160(1) via replication interface 825.

As described above Ethernet switch 116 is coupled to each of the memory controllers 156 and each of the memory targets 164, such that each memory controller (and its processor) can access any one of the memory targets 164 over the Ethernet. Each CPU subsystem is coupled to its memory target via a PCIe link. Each of CPU subsystems 150 includes one or more CPUs and each CPU includes one or more CPU cores. Each CPU may also be coupled any other CPUs via a processor interconnect such as a QPI link. Each of the memory controllers 156 may also be coupled to a local memory such as a DRAM (not shown) over a memory bus interface. Each of memory targets 164 includes one or more branches and each branch manages and controls one or more memory leaves. Each branch provides access to data stored in corresponding memory leaves. Each memory leave includes one or more solid state memory devices or chips.

Figure 12:
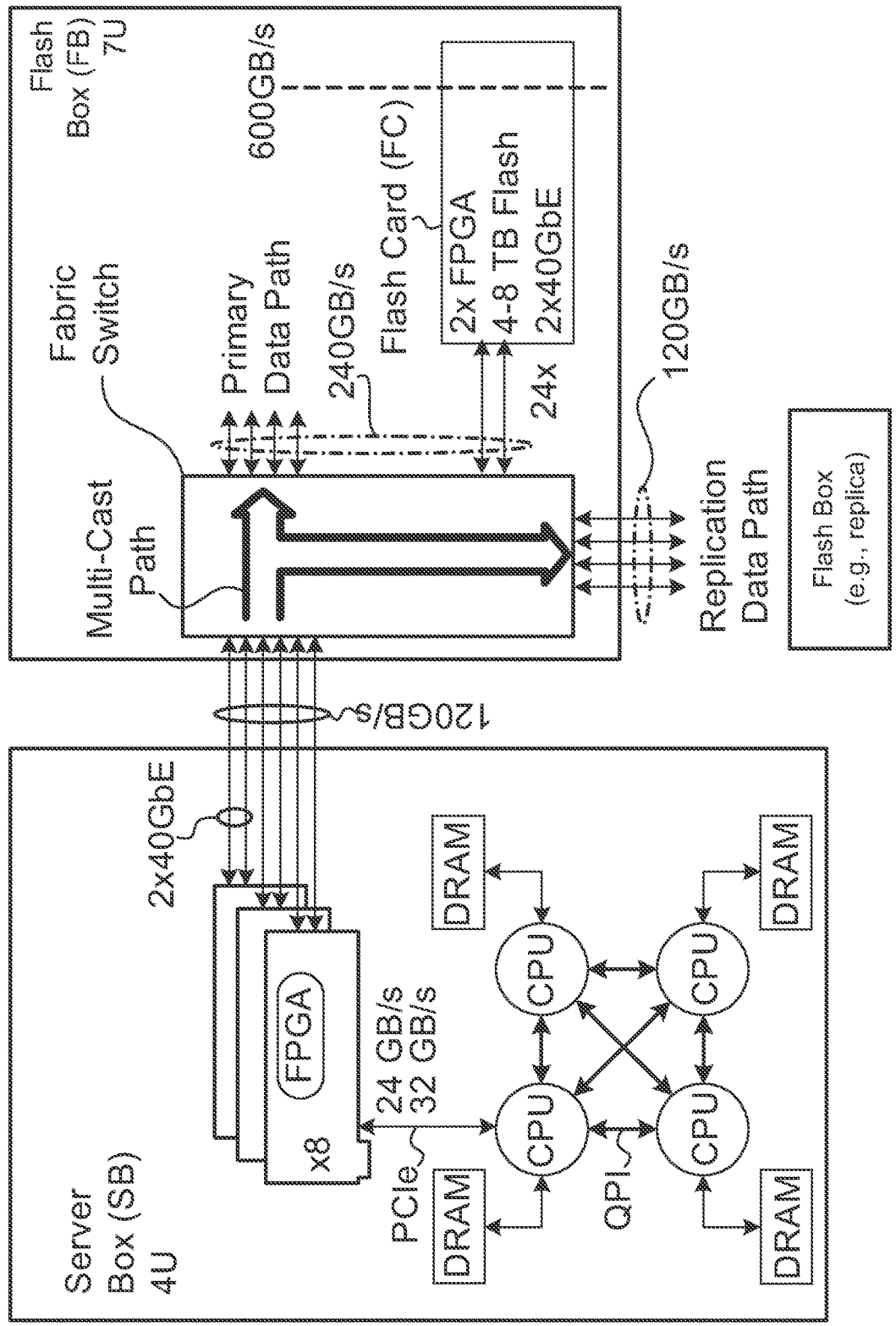
FIG. 12 shows a particular implementation of a memory complex having a multicast replication interface according to one embodiment.

In one embodiment, when shared memory fabric 116 receives data from a data source to be stored in one or more of memory targets 164, the data will be transmitted to the intended memory target(s). In addition, memory switch fabric 116 determines whether the data should also be replicated to another memory complex. Memory switch fabric 116 may examine the routing request or routing table maintained therein to determine whether a copy of the data should be replicated and where the copy should be replicated to, for example, using Ethernet protocols. The replication interface 825 could be used to replicate the same data to multiple memory complexes, similar to a multicast interface. FIG. 12 shows a particular implementation of a memory complex having a multicast replication interface according to one embodiment.

In one embodiment, most replication techniques have the CPU send a page to a local storage and then replicate it to some remote place. An embodiment of the invention defines a mechanism to do so simultaneously by use Ethernet as the transport to both the local and remote device.

Embodiments of the invention enable efficient architectural scale-out of both the computational capacity and the corresponding memory capacity. One form of scale-out involves adding CPU subsystems configured as independent computation-server boxes. The shared memory fabric maintains cache coherence among different CPUs that reside within the independent servers. In some embodiments the memory fabric transports cache coherence messages. In other embodiments the access to particular leaves is restricted to particular servers.

Embodiments of Cache Coherence Memory Models

Figure 13:
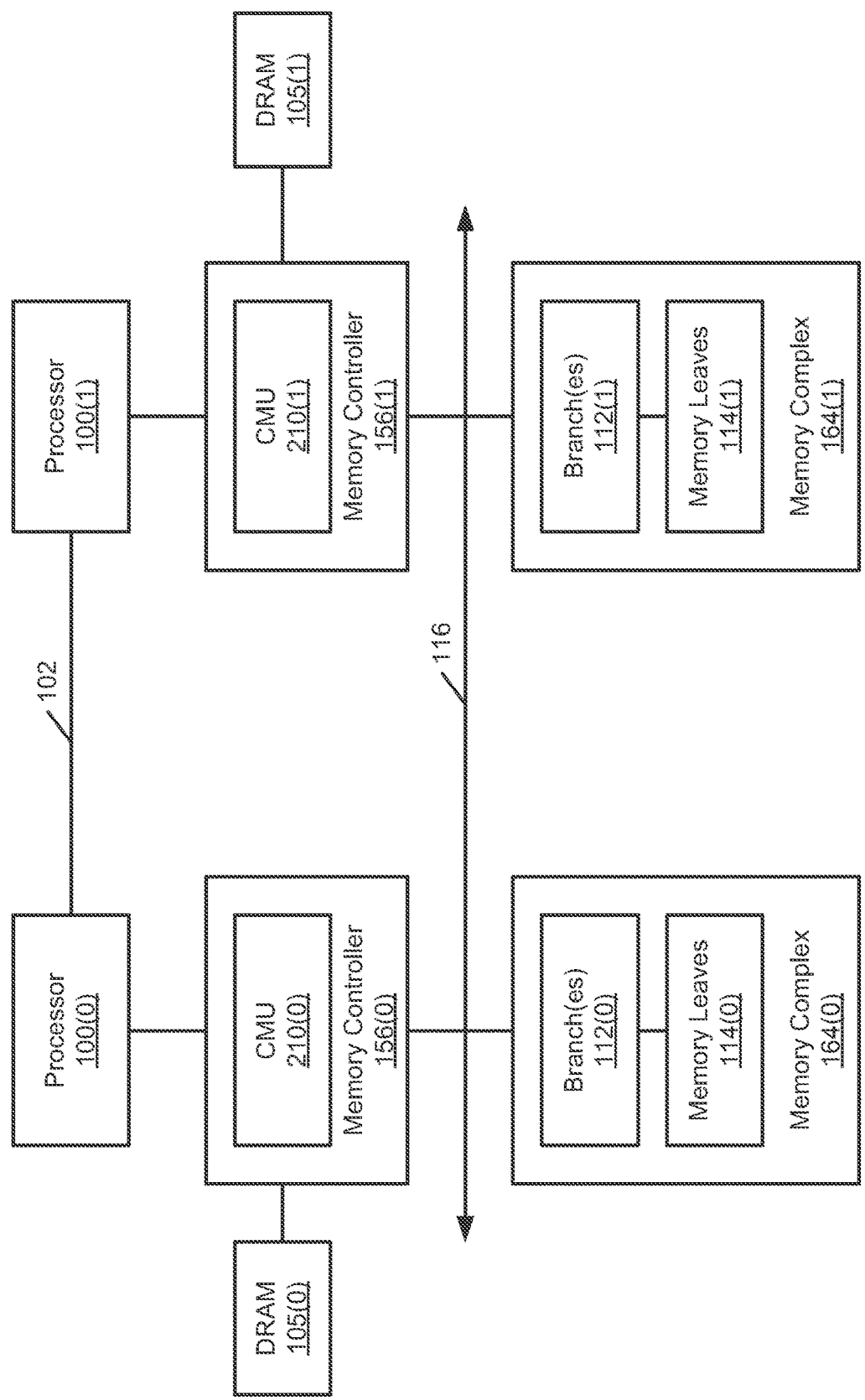
FIG. 13 is a block diagram illustrating a data processing system according to another embodiment of the invention.

FIG. 13 is a block diagram illustrating a data processing system according to another embodiment of the invention. In one embodiment, the system includes a number of processors, memory controllers, memory targets, and an Ethernet switch fabric coupled to the memory controllers and the memory targets. Each of the processors is coupled to each of the remaining processors via a processor interconnect, such as a Quick Path Interconnect™ (QPI). Each memory target includes one or more branches and a number of memory leaves managed by the branches. When a first memory controllers writes data to a first memory leaf via a first branch corresponding to the first memory leaf, the first memory controller sends a cache coherence message to remaining memory controllers to indicate that the data stored in the first memory leaf has been updated. A second of the remaining memory controllers may determine whether the corresponding data has been previously cached in their corresponding local memory (e.g., dynamic random access memory or DRAM). If so, the second memory controller may communicate with the first memory controller and/or the first branch, for example, over the Ethernet, to fetch the newly updated data from the first memory leaf and to update its local memory.

Referring to FIG. 13, in this example, the system includes processors 100(0) and 100(1) coupled to each other via processor interconnect 102. Although there are two processors shown, more processors can be included herein. Processors 100(0) and 100(1) are associated with memory controllers 156(0) and 156(1) respectively. Memory controllers 156(0) and 156(1) are coupled to Ethernet switch fabric 116. Memory complexes 164(0) and 164(1) corresponding to memory controllers 156(0) and 156(1) are also coupled to Ethernet switch fabric 116.

In one embodiment, each of memory controllers 156(0) and 156(1) includes a cache memory unit (CMU) such as CMUs 210(0) and 210(1) respectively, collectively referred to as CMUs 210. CMUs 210 communicate with each other to maintain cache coherency amongst multiple memory subsystems and memory controllers. When a memory controller writes data to its memory complex, a CMU associated with the controller sends a cache coherence message to another CMU of another memory controller to notify the remote memory controller that there is an update on the data stored in a storage device. If the remote memory controller has previously cached the same data in its local memory, the remote memory controller may fetches the data from the storage device to update its local memory.

For example, when memory controller 156(0) writes data from its local memory 105(0) to memory leaves 114(0), CMU 210(0) sends a cache coherence message to CMU 210(1) via Ethernet switch fabric 116 or processor interconnect 102. In response to the cache coherence message, CMU 210(1) determines whether the data stored in the same storage location has been previously cached in its local memory 105(1). If the data has been previously cached in local memory 105(1), CMU 210(1) fetches the data from memory leaves 114(0), for example, by invoking branch 112(0) via Ethernet switch fabric 116.

Figure 14:
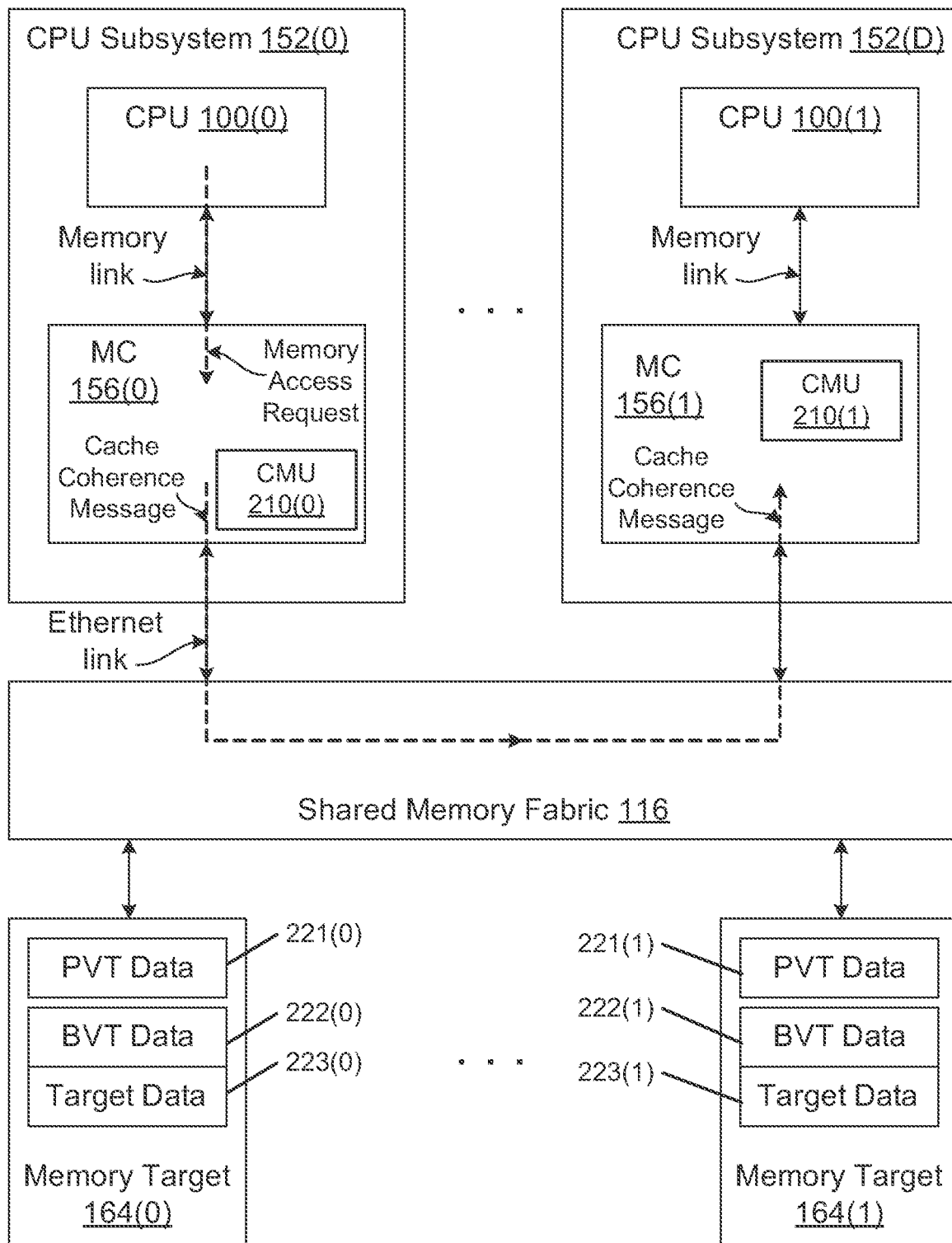
FIG. 14 is a block diagram illustrating a data processing system according to another embodiment of the invention.

FIG. 14 is a block diagram illustrating a data processing system according to another embodiment of the invention. FIG. 14 illustrates an exemplary cache coherence message being generated and transmitted through shared memory fabric 116. In this example, CPU 100(0) of CPU subsystem 152(0) generates a memory access request (e.g. a write request) to a page of data currently cached by CPU 100(1) residing within CPU subsystem 152(D}. In such a scenario, a cache coherence message may be transmitted from CMU 210(0) of MC 156(0) of CPU subsystem 152(0) to CMU 210(1) of MC 156(1) of CPU subsystem 152{D). In one scenario, CPU 100(1) then receives a cache flush request from MC 156(1).

As shown, PVT data 221, block virtualization table (BVT) data 222, and target data 223 may reside within a memory target 164. PVT data 221 and/or BVT data 222 may need to be managed within a cache coherence regime and may further need to be queried in conjunction with overall cache management.

Figure 15:
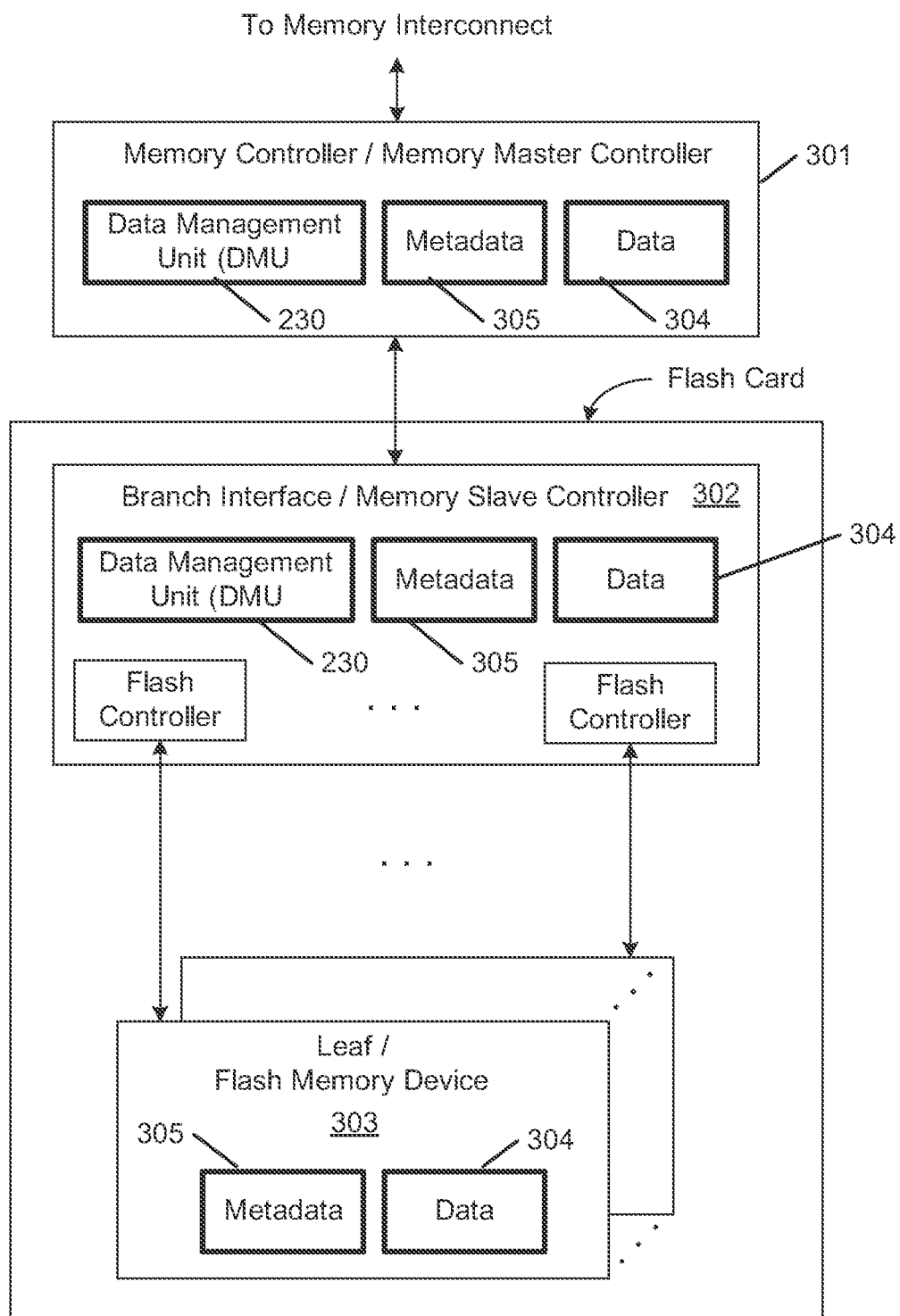
FIG. 15 is a block diagram illustration a data processing system according to another embodiment of the invention.

FIG. 15 is a block diagram illustration a data processing system according to another embodiment of the invention. FIG. 15 illustrates a data management unit (DMU) 230 disposed conceptually within a memory hierarchy such as a root memory hierarchy comprising a memory master controller 301 (MMC or simply "memory controller") and/or a memory slave controller 302 (MSC or "branch interface"). In one embodiment, the MSC 302 may be implemented as an FPGA and the FPGA may have sufficient memory resources to store cache coherence data 304 and metadata 305. In another embodiment, the MSC FPGA 302 may include an external memory resource such as an external DRAM or SRAM, configured to store at least cache coherence data 304 and metadata 305. In yet another embodiment, the MSC 302 is implemented as an FPGA with either internal memory resources or external memory resources (DRAM and/or SRAM) configured to store at least cache coherence data 304 and metadata 305. In still yet another embodiment, cache coherence data 304 and metadata 305 are stored within one or more flash memory devices. In other embodiments, cache coherence data 304 and metadata 305 may be stored in a combination of the above memory resources.

In one embodiment, DMU 230 is implemented using an application-specific logic circuit. In other embodiments, DMU 230 is implemented as a combination of non-volatile, computer-readable microcode and an embedded processing engine, the microcode being configured to direct an embedded processing engine to perform the functions of DMU 230. In alternative embodiments, DMU 230 may be implemented in data network components, for example data network components linking MMC 301 and MSC 302.

This system is representative of multiprocessor systems connected in a Non-Uniform Memory Architecture (NUMA) configuration with high-speed, point-to-point, cache-coherent memory interconnects. NUMA affinity refers to the practice of accessing data that is physically located on memory which has the least performance penalty induced by the non-uniformity of the memory architecture as seen by the core executing code. For optimal READ performance, the data should be transferred using Direct Memory Access (DMA) to the node that has the user buffer, in order to minimize the QPI traffic between nodes. Apart from the performance issues, there is one additional performance issue to minimize queuing delay for READs.

In one embodiment, a software driver module allocates READ operations on any of the processor cores in order to minimize the queuing delay for READ operations. However, the completion (DMA transfer) of the READ data will always be done on the node where the destination READ buffer resides. To achieve this, there will be one completion queue per core and the destination completion queue will be on the same NUMA node as the destination user buffer. Consequently, there will be no lock contention on the completion queue.

Figure 16:
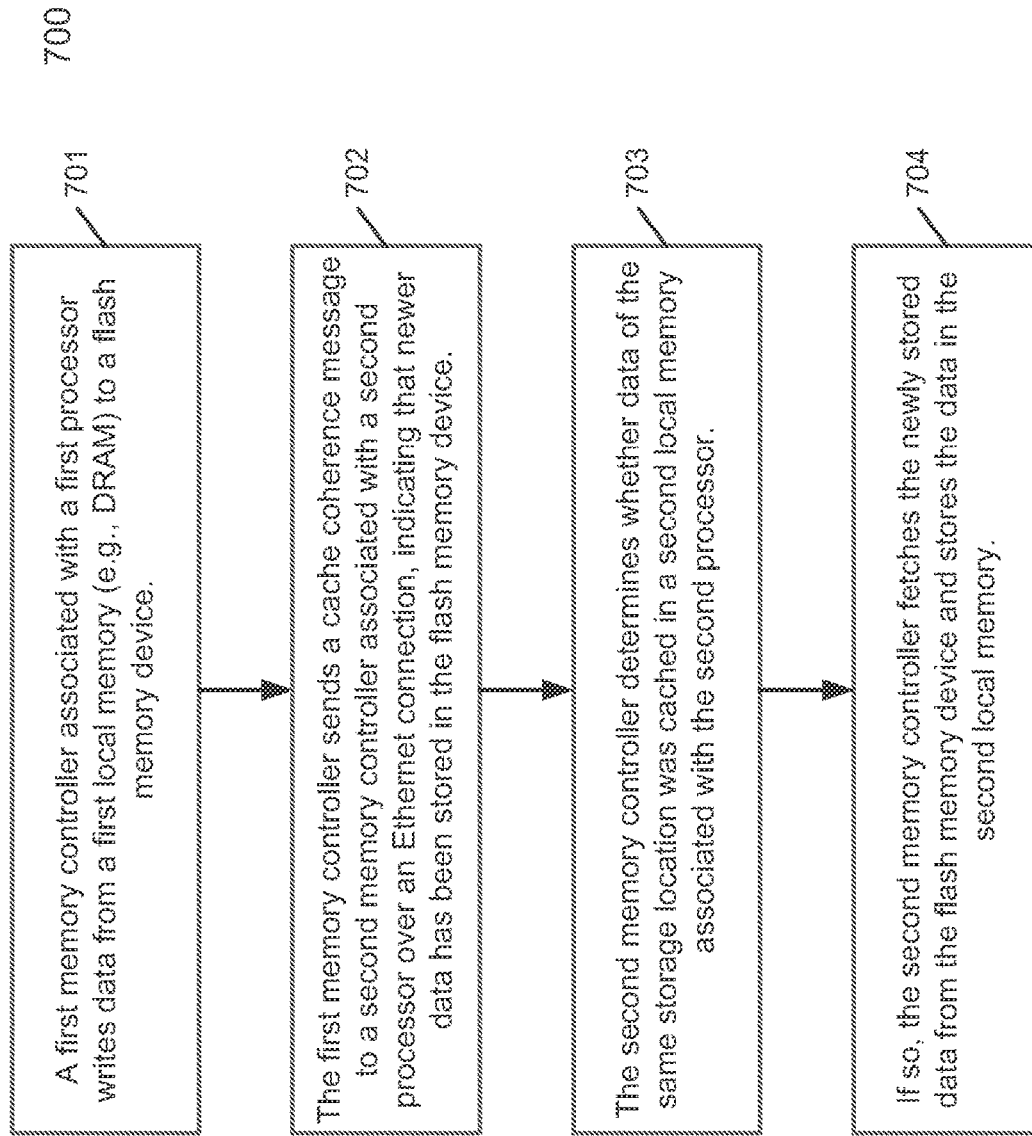
FIG. 16 is a flow diagram illustrating a processor of managing cached data according to one embodiment of the invention.

FIG. 16 is a flow diagram illustrating a processor of managing cached data according to one embodiment of the invention. Process 700 may be performed by processing logic which may be implemented in software, hardware, or a combination thereof. For example, process 700 may be performed by a cache management unit or a memory controller. Referring to FIG. 16, at block 701, a first memory controller associated with a first processor writes data from a first local memory (e.g., DRAM) to a flash memory device. At block 702, the first memory controller sends a cache coherence message to a second memory controller associated with a second processor over an Ethernet connection, indicating that newer data has been stored in the flash memory device. At block 703, the second memory controller determines whether data of the same storage location was cached in a second local memory associated with the second memory controller. If so, at block 704, the second memory controller fetches the newly stored data from the flash memory device and stores the data in the second local memory, replacing the previously cached data.

Embodiments of Software Implemented FTL Policies

Figure 17:
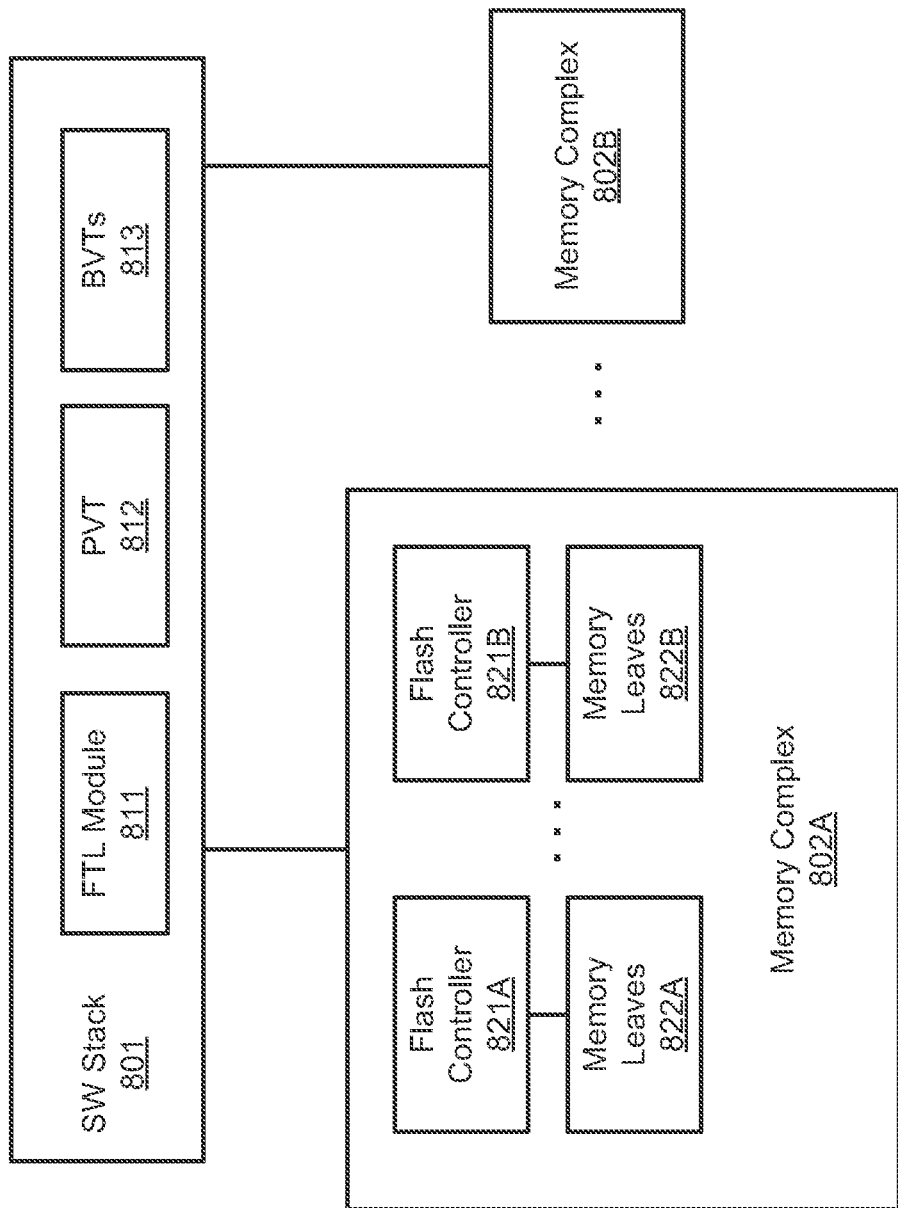
FIG. 17 is a block diagram illustrating a data processing system according to another embodiment of the invention.

FIG. 17 is a block diagram illustrating a data processing system according to another embodiment of the invention. System 800 may represent any of the data processing systems described above. Referring to FIG. 17, system 800 includes a software stack 801 managing and accessing a number of memory complexes 802A-802B. Software stack 801 may be implemented as a part of any of the software stacks described above, such as software stacks 106, 206, and/or 402. For example, software stack 801 may be hosted by an operating system and executed by a processor. Software stack 801 may be maintained by each of the memory controllers, branch controllers, and/or leaf controllers.

In one embodiment, software stack 801 includes an FTL module performing any of the FTL operations at a software level. A conventional FTL functionality is typically implemented at a lower level (e.g., within a flash memory device of a memory complex) or as a part of a flash controller (e.g., flash controllers 821A-821B). Access to the FTL layer in a conventional system may block another access to the FTL layer because of a limited number of IO requests available in parallel (e.g., 72 IO requests). By maintaining FTL module 811 in software stack 801, the number of IO requests that can be issued in parallel can be significantly increased (e.g., 8000 IO requests), without blocking access of other flash memory devices.

In one embodiment, software stack 801 further includes PVT 812 and one or more BVTs 813. PVT 812 and BVTs 813 may also be maintained by FTL module 811 according to an alternatively embodiment. PVT 812 and BVTs 813 are utilized by FTL module 811 to access memory leaves 822A-822B via the corresponding flash controllers 821A-821B of memory complex 802A. Note that software stack 801 may be coupled to a number of memory complexes such as 802A-802B.

A page virtualization table or PVT, such as PVT 812, is a multi-level table that contains the translation of a logical page to a flash page. The PVT table is initialized during a system startup phase (e.g. driver startup) and stores an entry for each logical page in the system. The number of entries is generally equal to the logical size of the block device in pages. Each entry in the PVT stores a logical page number, the corresponding flash page number, a sequence number and a bit to indicate if the page is valid or trimmed. The PVT may be reconstructed from flash memory by reading the metadata portion of every flash page when the driver is loaded during the initialization of the system.

In some embodiments of the invention data stored in solid-state memory (for example flash) moves independent of the file system. Consequently, a PVT may be used to move the data (stored in pages) while leaving the file system meta-data unchanged. In a large system, this table is often huge (e.g. 6 terabytes (TB) for a 64-bit page virtualization table in a system with 3PBs of capacity). In order to reduce the table size, table entries are "shared." In a first entry a 64-bit quantity is stored and in subsequent "shared" entries 16-bit offsets are stored. In one embodiment with shared entries for 16 pages, the table can be a third of the unshared size and so on. The pages must be close enough to use the small (16 bit) offsets, there must not be contention for the data structures, and the data must be temporally distributed so it can be read in parallel. In one embodiment one core of a CPU has exclusive access to a subset of page table entries, and that subset is non-contiguous (table entries) so that subsequent accesses will still be distributed across the cores.

A block virtualization layer or table, such as BVTs 813, abstracts physical block addresses from the driver stack and provides a virtually contiguous range of flash block addresses. The first initialization of the device identifies and stores any factory marked bad blocks. A BVT excludes these blocks and creates a virtually contiguous range for the physical addresses. During the course of normal operation, more unusable blocks may be identified and more blocks may become unusable over time and be subsequently identified. A block virtualization layer of the software system remaps virtual blocks residing on failed physical blocks to new physical blocks.

Conceptually, a BVT is below the PVT and translates a flash virtual block number to a physical block number. The virtual page number includes the virtual block number and the page index in a flash block (e.g., a page number or offset within a physical block). In one embodiment, the PVT uses 42 bits to store a flash virtual page number (FVPN). If the FVPN is represented as a block, page index tuple, then 32 bits are used for the block number and 8 bits are used for the page index. These 40 bits of page address cover 2.5PB of virtual space. This fits easily within the 42 bits available allocated for virtual page numbers in the PVT. The physical page number itself will not be exposed outside the topology and the block virtualization layer.

Figure 18:
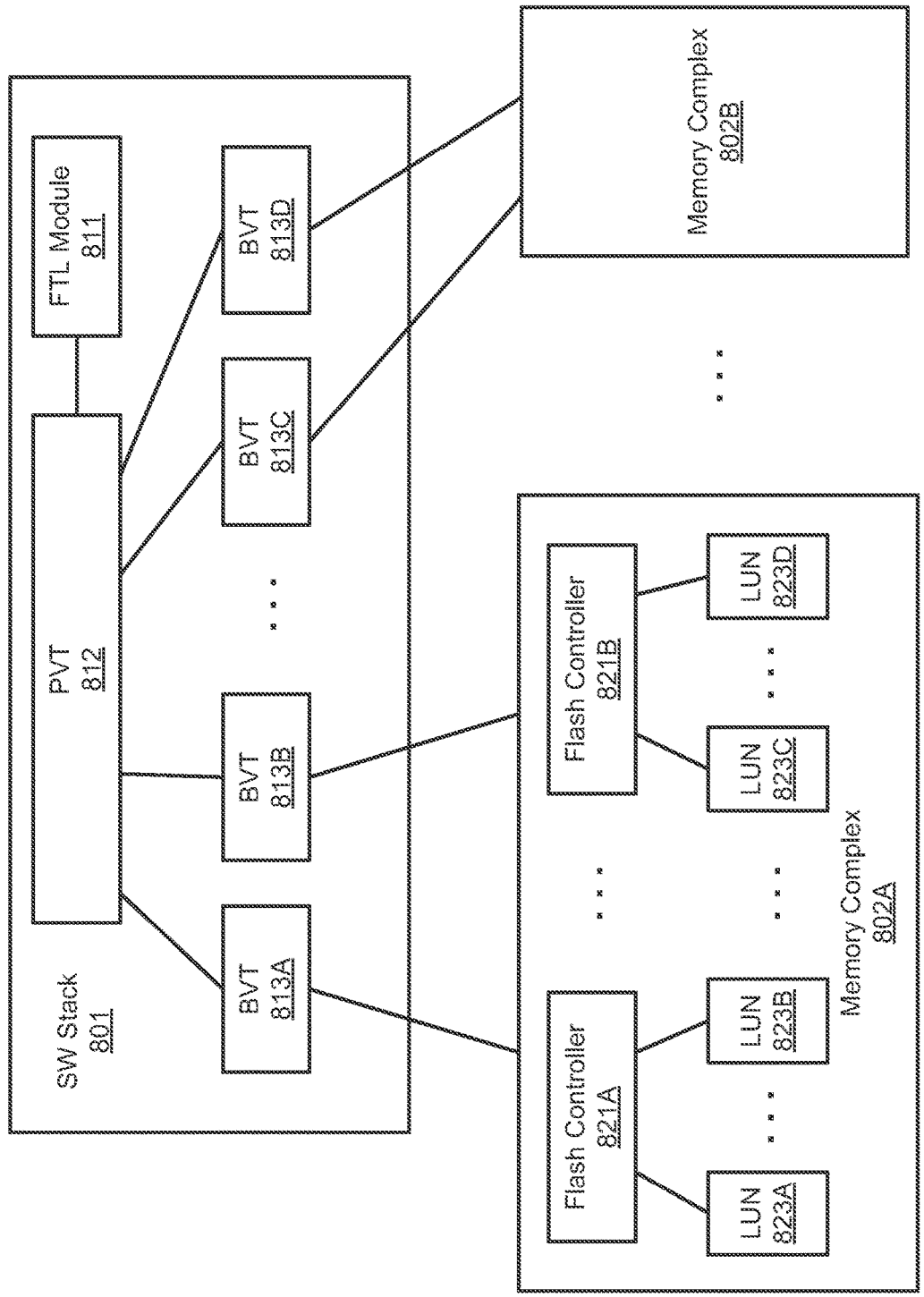
FIG. 18 is a block diagram illustrating a data processing system according to another embodiment of the invention.

FIG. 18 is a block diagram illustrating a data processing system according to another embodiment of the invention. Referring to FIG. 18, FTL module 811 maintains PVT 812 and a number of BVTs 813A-813D (collectively referred to as BVTs 813). PVT may further be partitioned into multiple PVTs as needed. PVT 812 includes a number of PVT entries, each PVT entry mapping a logical page number (LPN) to a virtual page number (VPN). A VPN Each of BVTs 813 is associated with a particular range of VPNs.

Figure 19:
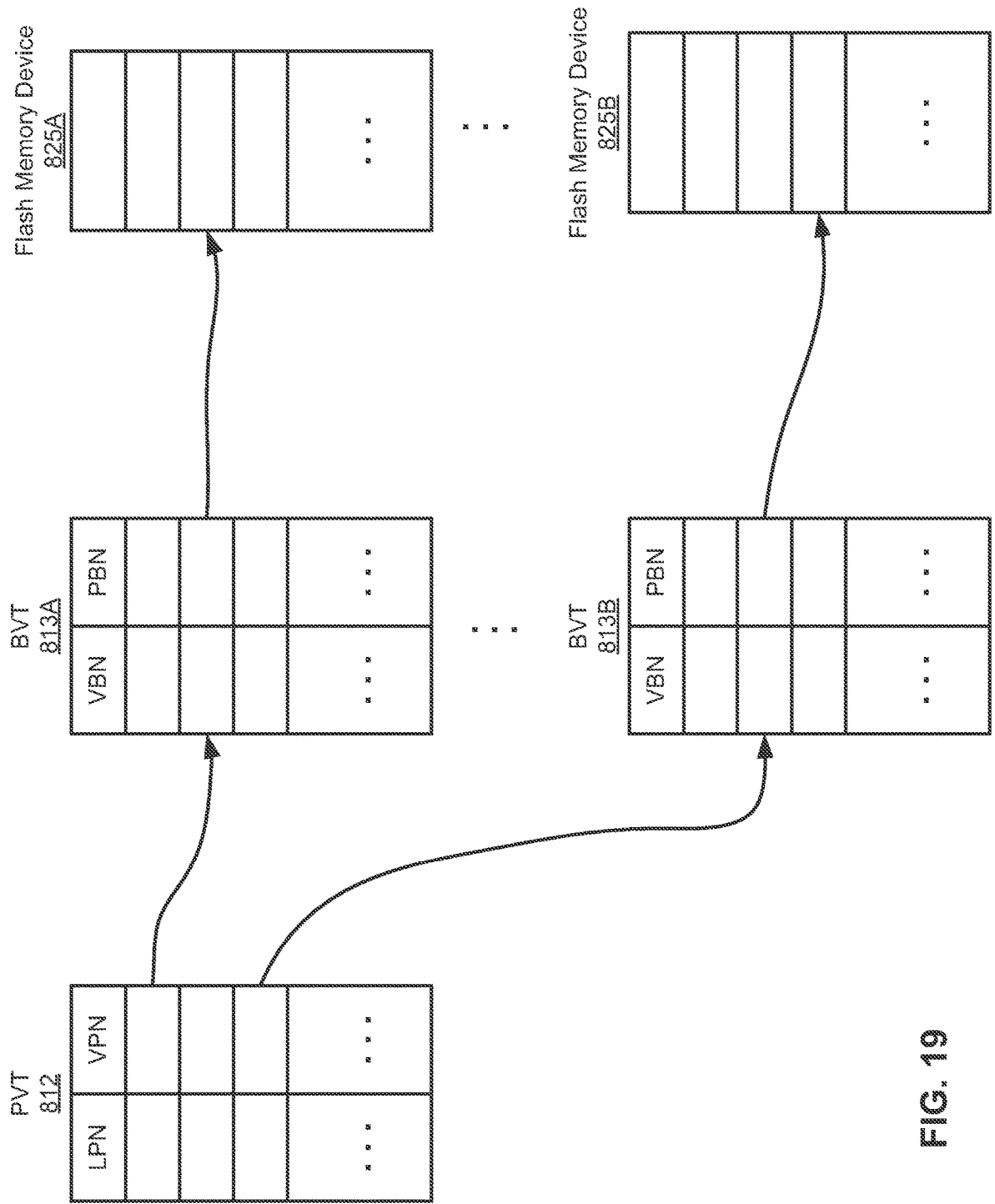
FIG. 19 is a block diagram illustrating an example of a page virtualization table and a block virtualization table according to one embodiment of the invention.

In one embodiment, referring now to FIG. 18 and FIG. 19, in response to a request for access data (e.g., read or write) in one of the logical units or LUNs 823A-823D of memory complex 802A, FTL module 811 looks up in PVT 812 based on the LPN to locate a PVT entry that matches the LPN. A VPN is obtained from the matching PVT entry. As described above, a VPN includes two portions: 1) a virtual block number (VBN), and 2) a phage number or page index within a block (e.g., physical block). Based on a VBN extracted from the VPN, FTL module 811 identifies one of the BVTs 813 corresponding to the VBN, in this example, assuming BVT 813A.

Based on the VBN, FTL module 811 looks up in BVT 813A to locate a BVT entry that matches the VBN and to obtain a physical block number (PBN) from the matching BVT entry. Based on the PBN, an IO request is issued and sent down to flash controller 821A. The IO request may include the PBN and a page number obtained from the VPN). The page number specifies a page (or an offset) within a physical block indicated by the PBN in flash memory device 825A. In response, flash controller 821A accesses the specified page of the physical block in one of the LUNs 823.

In a conventional system, the PVT 812 and BVTs 813 are maintained by a flash controller. When an IO request is issued, other IO requests maybe blocked to access PVT 812 and BVTs 813 in order to determine the physical block numbers. As a result, the number of IO requests that can be issued in parallel may be limited (e.g., 72 IO requests). By maintaining PVT 812 and BVTs 813 in software stack 801, the mappings of physical blocks are performed within software stack 801 in a non-blocking manner. When an IO request is sent down to a flash controller, the physical block number of a LUN has already determined. The flash controller can simply access the requested LUN based on the IO request. Other IO requests for accessing other regions of the same LUN or other LUNs are not blocked. As a result, the number of IO requests that can be sent down in parallel can be significantly increased (e.g., 8000 IO requests).

In addition, according to one embodiment, by maintaining the PVT 812 and BVTs 813 within software stack 801, the access patterns of the flash memory devices can be monitored and tracked. For example, based on the access patterns, a storage manager (not shown) can determine which storage regions are frequently accessed regions (e.g., hot regions or cold regions), what kinds of accesses (reads or writes, distribution of reads and writes like percentages of reads vs. writes), a sequence of the accesses, or workloads of the memory devices, etc. Based on this information, a quality of service (QoS) policy may be selected and applied. More IO requests can be issued in parallel if accesses to different regions are requested. A garbage collection process can be also be initiated on the flash memory devices based on the workloads, which can be determined based on the tracking information.

The workload information can also be utilized for route selections for accessing data stored in a memory device via a number of routes. For example, if a local memory controller attempts to access data stored in a local memory (e.g., DRAM) and its path to the local memory is busy (e.g., based on the access workload), the local memory controller may communicate with a remote memory controller to fetch the same data from the local memory via a processor interconnect. Alternatively if the same data is also stored in a flash memory device, the remote memory controller can fetches the data from the flash memory device. The remote memory controller can then send the data to the local memory via the Ethernet.

Similarly, if a local processor attempts to read data from a remote memory (e.g., DRAM) and to save the data to a local flash memory device, the local processor communicates with a remote processor via a processor interconnect. The remote processor and a remote memory controller read the data from the remote memory. The remote memory controller sends the data to a local memory controller over the Ethernet and the local memory controller saves the data to the local flash memory device.

Figure 20:
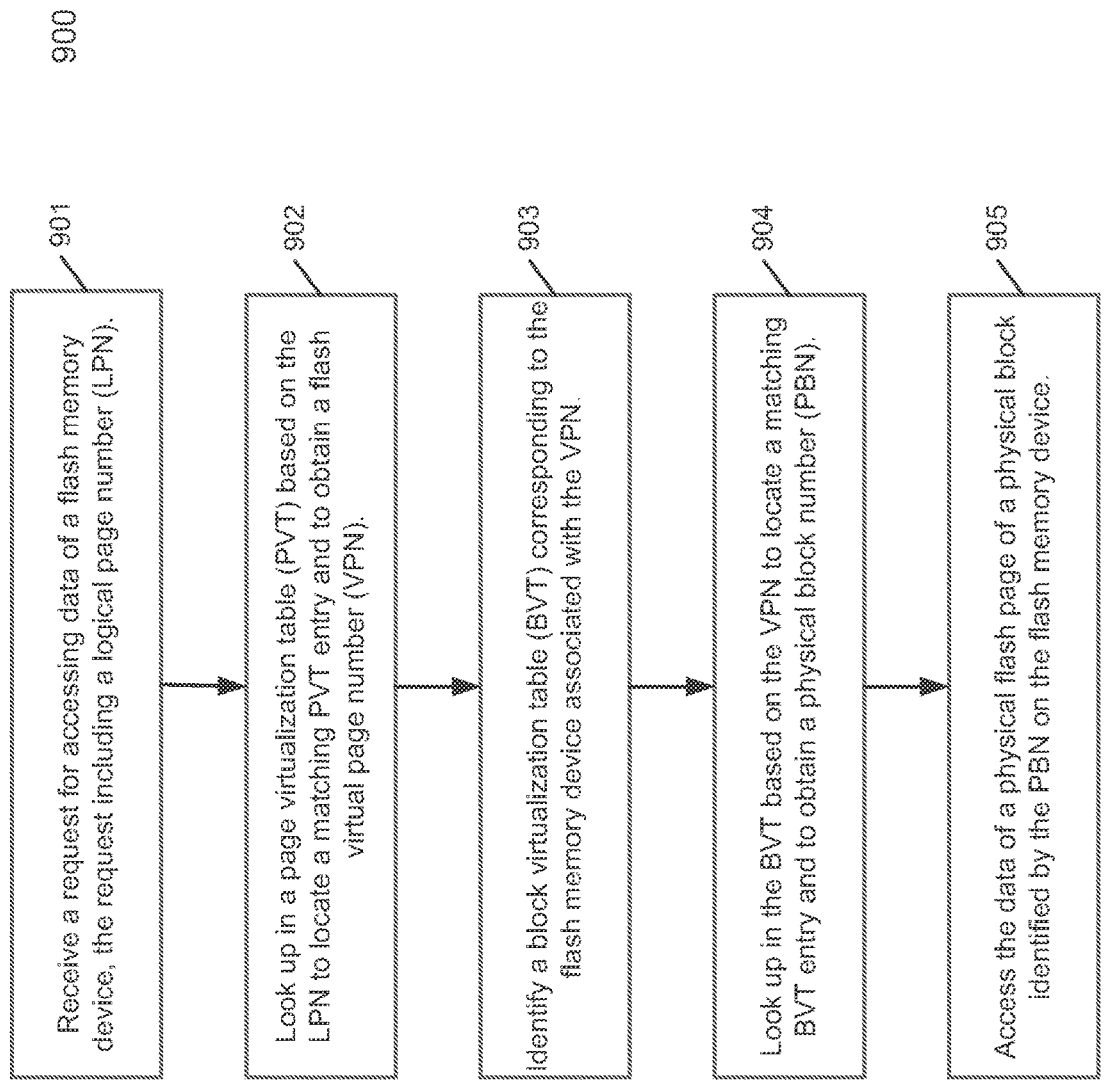
FIG. 20 is a flow diagram illustrating a process of accessing flash memory devices according to one embodiment of the invention.

FIG. 20 is a flow diagram illustrating a process of accessing flash memory devices according to one embodiment of the invention. Process 900 can be performed by processing logic which may include software, hardware, or a combination thereof. For example, process 900 may be performed by FTL module 811. Referring to FIG. 20, at block 901, processing logic receives a request for accessing data of a solid state memory device (e.g., flash memory device), where the request includes an LPN. At block 902, processing logic looks up in a PVT based on the LPN to locate a PVT entry and to obtain a VPN from the matching PVT entry. At block 903, processing logic identifies a BVT corresponding to a solid state memory device associated with the VPN. At block 904, processing logic looks up in the BVT based on the VPN to locate a matching BVT entry and to obtain a PBN from the matching BVT entry. At block 905, processing logic accesses the data of a physical page of a physical block identified by the BPN on the solid state memory device.

The architecture as described throughout this application can be expanded by adding more processor subsystems and/or memory subsystems by coupling them over the Ethernet fabric. As larger and larger datasets must be handled, more and more memory capacity may be required. A mechanism as described above for increasing the memory capacity by utilizing many interconnected memory fabrics, connected either through the processor interconnect (e.g. a Quick Path Interface (QPI), a memory interface (e.g. DDR3 or DDR4), and/or a high speed peripheral interconnect (e.g. PCIe or RapidIO™) is required. This mechanism allows parallel access to the memory fabric through individual memory controllers connected to the appropriate interfaces in the distributed computing nodes. With a sufficient number of nodes the memory capacity can be suitably adjusted. This mechanism also allows parallel access to the memory fabric through individual memory controllers connected to the appropriate interfaces in the distributed computing nodes. With a sufficient number of computing nodes the computing power can be suitably adjusted.

One embodiment implements a mechanism that provides a consistent memory model for multiple computing nodes that share data, in order to provide parallel processing to the shared data. This mechanism provides a consistent memory model to each node and can be implemented either at the memory controller, using the memory fabric interconnect, or in the memory fabric itself. A consistent memory model insures each computing unit that accesses the data in the memory "sees" data that was (or is) valid at the time of access. This guarantee exists because all cached data, by which the system maintains a memory content which may be maintained in multiple locations simultaneously, is maintained in a coherent manner. In the case of multiple memory controllers attached to multiple computing nodes, copies of the same memory contents stored in multiple memory controllers or on multiple memory chips must be synchronized.

In one embodiment, the memory controller contains a cache management unit (CMU) that receives data from the leaves attached to branches. The leaves all contain a data management unit (DMU). The DMU maintains a coherent mapping of the page and block addresses of the data in the leaf. Access to the data is recorded in a directory of memory controller cache units that may modify the data. If a memory controller attempts a modification, the cached copy of the data in other memory controllers is invalidated by the leaf DMU.

One embodiment implements a mechanism to provide for multiple computing nodes that share metadata, in order to provide parallel processing of the underlying shared data. Embodiments may separate the management of the data coherence from the management of the metadata coherence. This mechanism provides a consistent metadata management model to each node and can be implemented either at the memory controller, using the memory fabric interconnect or in the memory fabric itself. A consistent metadata management model insures metadata management operations (e.g. free space recovery, error correcting code generation and decoding, etc.) that access the metadata describing the data in the memory, all access metadata that was (or is) valid at the time of access. This guarantee exists because all cached metadata, by which we mean metadata that may be maintained in multiple locations simultaneously, is maintained in a coherent manner. In the case of multiple memory controllers attached to multiple computing nodes, copies of the same metadata stored in multiple memory controllers or on multiple memory chips must be synchronized.

The management of solid-state memory devices implements mechanisms for the remapping of memory addresses onto the underlying chips so that failed chips may be replaced or bypassed, among other eventualities. The original mapping is accomplished by maintaining the metadata in a PVT. Portions of the metadata describing the mappings of the data on a particular leafs memory chip (or chips) may be divided among the memory controllers such that a particular memory controller maintains the metadata for a subset of the entire system, and all the memory controllers, taken as a group, contain the required metadata for all the chips. The division of the metadata is done in a way that enables the distribution of data on memory leaves in a way that allows for the subsequent parallel access of the data.

Alternative Embodiment of Data Processing Systems

Figure 21:
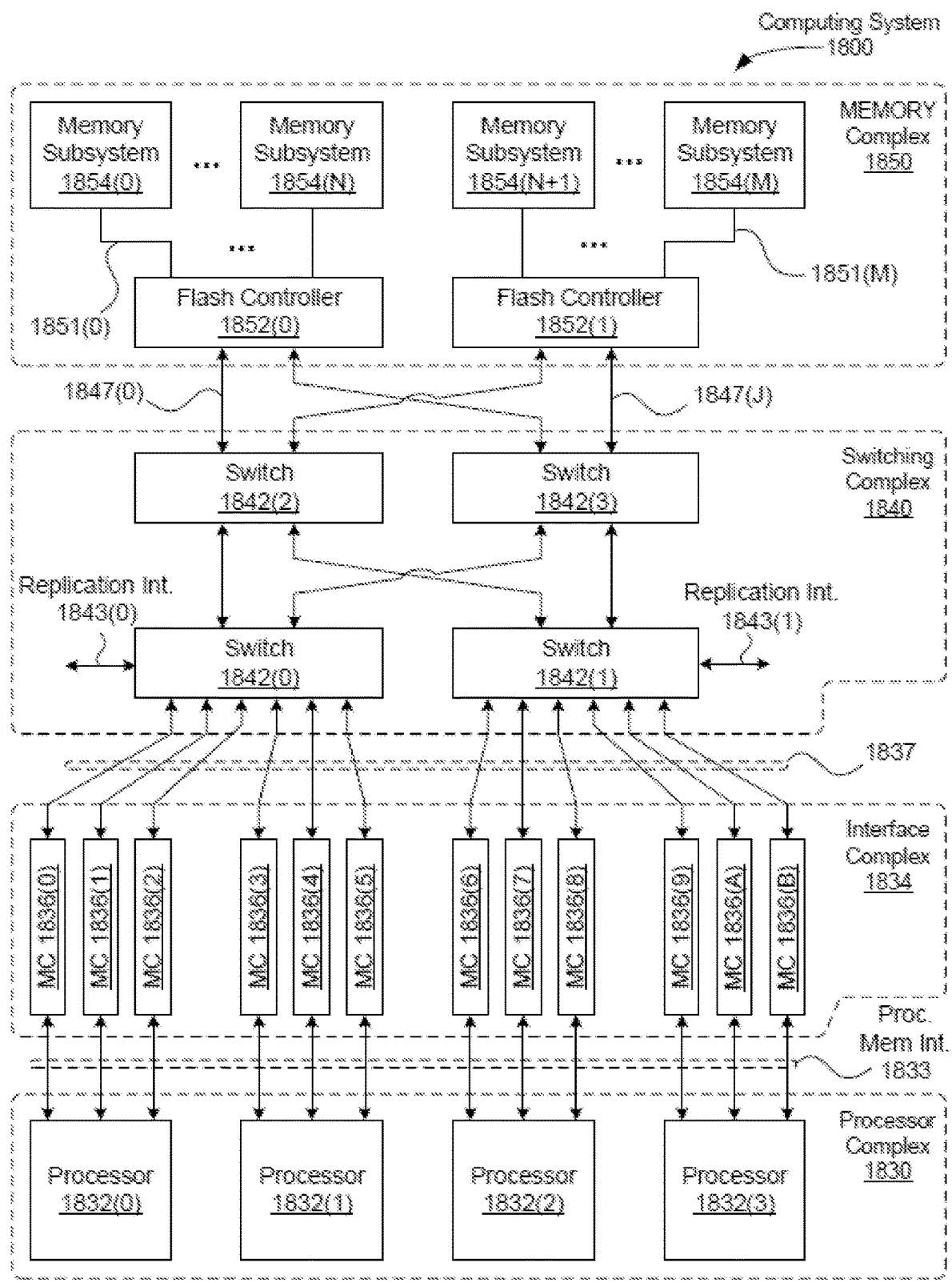
FIG. 21 is a block diagram illustrating a data processing system according to another embodiment of the invention.

FIG. 21 is a block diagram illustrating a data processing system according to another embodiment of the invention. FIG. 21 illustrates a computing system 1800, according to one or more embodiments of the present invention. As shown, computing system 1800 includes a processor complex 1830, an interface complex 1834, a switching complex 1840, and a memory complex 1850. Processor complex 1830 may include one or more processors 1832. Each processor 1832 may include one or more general purpose central processing unit (CPU) cores, one or more multithreaded graphics processing unit (GPU) cores, or any technically feasible combination thereof. In one embodiment, the processor complex 1830 includes four processors 1832(0) through 1832(3), wherein each processor 1832 includes at least fifteen CPU cores. Each of the at least fifteen CPU cores may include a local cache (e.g., L0 cache), or a cache hierarchy comprising a local cache. In another embodiment, at least one processor 1832 includes one or more GPU cores. Processors 1832 are coupled to interface complex 1834 through a processor memory interface 1833. In one embodiment, at least one processor 1832 corresponds to at least one CPU 100 of FIG. 1.

As shown, each processor 1832 may be coupled to one or more memory controllers (MCs) 1836 within the interface complex 1834. In one embodiment, a memory controller 1836 corresponds to a memory controller 110 of FIG. 1. In one embodiment, each processor 1832 is coupled to three or more memory controllers 1836. Each memory controller 1836 is coupled to the switching complex 1840 through a switch interface 1837, comprising independent links. As shown, each memory controller 1836 is coupled to an independent port on an associated switch 1842 within the switching complex 1840. In one embodiment, switches 1842 are coupled together to form a non-blocking switch cluster, such as a crossbar switch, configured to forward access requests from memory controllers 1836 to memory complex 1850 and to forward data resulting from the access requests back to corresponding memory controllers 1836. Each switch 1842 may be coupled to one or more flash controllers 1852 within the memory complex 1850 through corresponding flash controller interface links 1847. In one embodiment, switches 1842(2) and 1842(3) are each coupled to both flash controllers 1852(0) and 1852(1). In such an embodiment, switches 1842(0) and 1842(1) may include replication interfaces 1843, configured to replicate memory requests to an additional memory complex (not shown), an additional switching complex (not shown), or a combination thereof. The replicated memory requests may mirror memory access requests (e.g., read, write requests) transmitted to memory complex 1850 by switches 1842(2) and 1842(3).

Memory complex 1850 includes flash controllers 1852 and memory subsystems 1854. Each flash controller 1852 may be coupled through a memory interface 1851 to a corresponding memory subsystem 1854. In one embodiment, each flash controller 1852 is coupled to a number of memory subsystems 1854. Each memory subsystem 1854 may include one or more integrated circuit memory devices. In one embodiment, each memory subsystem 1854 includes one or more flash memory devices. In another embodiment, one or more memory subsystems 1854 include DRAM memory devices. In certain embodiments, each memory subsystem 1854 corresponds to leaf 114 as described above.

During normal operation, memory access requests are generated by the processors 1832. The memory access requests are transmitted through memory controllers 1836, and forwarded by switches 1842 to appropriate flash controllers 1852. Each flash controller 1852 directs a given memory access request to an appropriate memory subsystem 1854, where data associated with the memory access request resides. A memory access request acknowledgement is returned from the flash controller 1852. A given acknowledgement may include a block of data requested by a memory read request, or a write acknowledgement in response to a memory write request. Caching may be implemented within the memory controllers 1836, switches 1842, flash controllers 1852, or any combination thereof. In certain embodiments, write caching may provide a lower latency acknowledgement to a write request generated by a processor 1832. For example, in one embodiment, memory controllers 1836 implement write caching, whereby a write completion acknowledgement is transmitted back to a processor 1832 from a memory controller 1836 prior to associated data being written to a corresponding target memory subsystem 1854.

In one embodiment, each memory controller 1836 is configured to provide a request queue to accommodate a number of pending memory requests generated by multiple processor cores and/or multiple process threads associated with each processor 1832. Queue priority may be given to read requests over write requests bound for the memory complex 1850, whereas write acknowledgements may be given priority over read acknowledgements for acknowledgements bound for the processor complex 1830. Accommodating multiple pending memory access requests (e.g., concurrent, outstanding read requests and write requests) creates multiple design consequences and requirements for memory controllers 1836.

In one embodiment, a memory address generated by a process executing on processor 1832 is remapped from a data address space (DAS) to a flash virtual address (FVA) space, and is further mapped to a flash virtual page number (FVPN), and finally is mapped to a flash physical address space (FPAS). A portion of the remapping may be performed by processor 1832, memory controller 1836, switch 1842, flash controller 1852, or any combination thereof.

Embodiments of computing system 1800 need to operate in configurations that are significantly larger in scale (e.g., orders of magnitude larger) than conventional computer systems, while preserving common access for each processor 1832 to large-scale data, which may reside in memory complex 1850. As a consequence of large processing scale, unconventionally large memory scale for application data, and a requirement to provide shared access to potentially all application data residing within memory complex 1850 to all processes executing within processors 1832, certain additional design features may be advantageously implemented within computing system 1800. Such design features are not conventionally required in typical computing systems. Specific design features associated with efficient performance at large scales include: (1) scalable paging operations, (2) scalable allocation and utilization of memory capacity, (3) scalable memory page and block operations to accommodate large, low latency read and write operations, (4) data protection for large data sets, and (5) performance optimizations for solid-state memory related to operational constraints associated with conventional solid-state memory devices (e.g., flash memory).

More specifically, large-scale computing over multiple processors with multiple execution threads will generally generate a large number of concurrent, independent memory access requests. Such memory access requests may be directed to a shared data image of application data in memory complex 1850, resulting in extremely intensive access utilization relative to conventional computing systems.

Furthermore, because a given application data footprint may be orders of magnitude larger (e.g., hundreds of terabytes through hundreds of petabytes) than a conventional application data footprint comprising less than a terabyte, computing system 1800 advantageously implements data protection for the application data. Data protection in such a setting may be extremely helpful because the physical memory soft error rate for hundreds of terabytes of data in prevailing solid-state memory technology could yield many errors during the execution time of target applications. Certain memory device technologies may even cause multiple, concurrent errors at a relatively frequent rate, leading to a need for two or more layers of data protection. In certain settings, entire blocks of data may be corrupted or "erased," requiring the implementation of an erasure code or technical equivalent to provide data protection and recovery. For example, if a solid-state flash memory device comprising memory subsystem 1854 fails or if a block of data therein is corrupted, a block of data is lost (e.g., erased). An erasure code may be implemented to recover blocks of data, such as the block of data lost in the above example. Failure events leading to significant loss of data are sufficiently rare that conventional systems designers are not motivated to develop features to address such failure events. However, with active, solid-state memory hosting application data sized in the hundreds of terabytes to many petabytes, data protections becomes highly advantageous if not essential for the proper operation of computing system 1800.

In certain embodiments, computing system 1800 may implement scalable paging operations to accommodate very high throughput, low-latency memory operations associated with processors 1832 accessing memory complex 1850. Specifically, computing system 1800 may implement a mechanism for providing compact virtual page tables implemented to perform different address space mappings (e.g., the DAS to FVA, to FVPN to FPAS mapping discussed above). Because the target block range within memory complex 1850 is so large, conventional virtual page mapping techniques would result in large, inefficient mapping tables. A virtual page mapping technique is disclosed herein that reduces overall table size for greater memory access and execution efficiency.

Furthermore, computing system 1800 may implement lockless queues for transmitting commands and command completion acknowledgments between two processors without either processor needing to block execution progress provided there is space in the queue. In one embodiment, a lockless queue is implemented as a circular buffer.

In certain embodiments, computing system 1800 may implement scalable allocation and utilization of memory capacity to accommodate an extremely large application data footprint. Specifically, computing system 1800 may implement a mechanism for moving live (allocated to active application processing) blocks within the memory complex 1850 without processor intervention. Such a move operation is referred to herein as a migration pivot. In one embodiment, the migration pivot is implemented to accommodate data protection. Furthermore, computing system 1800 may implement distributed read copy operations in preparation for an erase operation to enable high-performance read operations. This operation may allow a memory complex 1850 comprising flash memory devices to efficiently service read/write requests from the processor complex 1830, while also reclaiming and preparing pages to be newly written. Computing system 1800 may also implement a trim range function to operate in conjunction with one or more file systems residing within memory complex 1850.

In one embodiment, memory complex 1850 is configured to store data blocks associated with application data, as well as associated virtual mapping tables/virtualization tables, bad block information, trim information, and other data technically relevant to operation and reconstruction of data within memory complex 1850. By storing virtualization maps, bad block maps, and the like, within the same protected data set as target data, a full recovery of data and virtual mappings associated with memory complex 1850 may be advantageously performed using only data available on memory complex 1850. As one example of this technique, By contrast, many conventional memory systems store virtualization tables independently of target data, creating inefficiencies during recovery.

In certain embodiments, computing system 1800 may implement scalable memory page and block operations to accommodate large, low latency read and write access to memory complex 1850. These operations are implemented to achieve high utilization of total cross-sectional bandwidth over every available memory subsystem 1854 within memory complex 1850, thereby providing extremely high memory bandwidth to processor complex 1830. In one embodiment, a massively parallel memory architecture enables scalable memory page and block operations. In certain embodiments, a DRAM cache provides read-ahead caching and reconstruction-related computation resources, which may, for example, be implemented within each of the memory controllers 1836. One embodiment provides for fast acknowledgment of write operations through write buffering in a DRAM buffer followed by an acknowledgement prior to write data being written to a designated target. The DRAM buffer may be implemented within the memory controllers 1836. Alternatively, the DRAM buffer may be implemented within system memory (not shown) associated with, or coupled directly to, processors 1832.

In conventional systems, memory access performance is typically constrained by system efficiencies when handling larger (e.g., 8 MB) block access requests. Operating systems may provide for asynchronous operations, but overhead associated with managing large block access requests may eliminate any efficiencies gained by performing asynchronous input/output operations. In one embodiment, a technique for multiple, concurrent input/output operations improves performance associated with performing large input/output operations, such as large block reads/write operations by distributing associated workload over multiple cores comprising one or more processors 1832.

Read performance may be improved by a technique referred to herein as "read-around," whereby a block of data associated with a busy memory resource comprising a memory subsystem 1854 is reconstructed rather than read. A memory resource may be busy because a block comprising the memory resource is being written. The memory resource may include a sub-circuit referred to herein as a LUN. In certain scenarios, writing a block of data takes considerably longer (e.g., 20× longer) than reconstructing the block of data. Therefore, the read-around technique may provide a performance advantage compared to waiting and performing a direct read of the target data. In certain embodiments, write operations are scheduled to advantageously facilitate read-around opportunities to improve average read performance. In one embodiment, memory bandwidth is offered to different memory controllers 1836 according to available bandwidth for each. Available bandwidth may represent a fixed system characteristic or a prevailing workload.

In certain embodiments, computing system 1800 may implement data protection for large data sets. In one such embodiment, computing system 1800 may implement data protection in conjunction with sequence numbers to enable re-creation of a page virtualization table (PVT) in the event of a system crash. In one embodiment, computing system 1800 may implement adaptive data protection for different failure characteristics according to a system lifetime. For example, a system may initially operate with a less conservative protection scheme and transition to a more conservative protection scheme at some point in operational time. In certain settings, garbage collection interacts with a data protection scheme. This interaction is further complicated by practical requirements associated with needing to erase flash memory prior to writing the flash memory. In one embodiment, computing system 1800 implements a round-robin allocation system for writing blocks during garbage collection, and a reclamation mechanism that may be triggered according to a free-space threshold. In one embodiment, continuous data protection and continuous garbage collection are provided by adaptively balancing application access requests and garbage collection activities. The above techniques advantageously enable computing system 1800 to efficiently operate at high performance levels while providing a high degree of data protection. As discussed previously, data protection becomes highly advantageous given the scale of application memory footprints supported by the computing system 1800.

In certain embodiments, computing system 1800 may implement performance optimizations for solid-state memory related to operational constraints associated with conventional solid-state memory devices (e.g., flash memory). One constraint relates to read and/or write "disturbance" associated with accessing adjacent blocks of data within a flash device. In one embodiment, an efficient command processing circuit module implements an access abstraction that includes a set of state machines for implementing detailed access control signaling to flash devices comprising memory subsystems 1854. Certain embodiments of computing system 1800 require a high degree of fault tolerance for highly-available computing and therefore implement component-level redundancy.

The above techniques and embodiments may be implemented independently in various systems architectures, however they may be advantageously implemented together within computing system 1800 to provide a high-performance, high availability computation platform for executing applications requiring unconventionally large application memory footprints.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
a plurality of central processing unit (CPU) subsystems, wherein each CPU subsystem includes a plurality of CPUs and a plurality of memory controllers, each memory controller corresponding to one of the CPUs;
a plurality of memory complexes, each memory complex being associated with one of the CPU subsystems, wherein each memory complex comprises one or more branches, and
a plurality of memory leaves to store data, wherein each of the branches is coupled to one or more of the memory leaves and to provide access to the data stored in the memory leaves; and
an Ethernet switch fabric coupled to each of the memory controllers of the CPU subsystems and each of the branches of the memory complexes, wherein each of the memory controllers is communicatively connected with each of the branches of any of the memory complexes via the Ethernet switch fabric over an Ethernet to access data stored in any of the memory leaves associated with the corresponding branch,
wherein a first memory controller associated with a first CPU of a first CPU subsystem is communicatively connected with a second memory controller associated with a second CPU of the second subsystem via the Ethernet switch fabric over the Ethernet and each of the branches provides access to data stored in local memory leaves by a remote CPU via a remote branch of the remote CPU over the Ethernet, without having to invoke a local CPU.

2. The system of claim 1, wherein each of the CPUs of each of the CPU subsystems is coupled to any one of the CPUs of the CPU subsystem via a processor interconnect.

3. The system of claim 2, wherein the processor interconnect comprises a Quick Path Interconnect™ (QPI).

4. The system of claim 2, wherein the first memory controller associated with the first CPU of the first CPU subsystem is communicatively connected with the second memory controller associated with the second CPU of the second CPU subsystem via a corresponding QPI or via the Ethernet switch fabric over the Ethernet.

5. The system of claim 1, further comprising a plurality of dynamic random access memory (DRAM) devices, each DRAM device being coupled to one of the memory controllers via a corresponding memory bus interface.

6. The system of claim 1, wherein each of the memory leaves comprises one or more solid state memory devices.

7. The system of claim 1, wherein each of the branches provides access to the data stored in the local memory leaves by a local processing unit via a corresponding memory controller.

8. The system of claim 1, wherein each CPU subsystem is coupled to its associated memory complex via a peripheral component interface express (PCIe) link.

9. The system of claim 1, wherein each CPU comprises a plurality of CPU cores.

10. The system of claim 9, wherein each of the processor cores represents a thread processor, and wherein each thread processor is to execute a specific thread.

11. The system of claim 1, wherein the CPU subsystems are disposed within a processor subsystem chassis of an electronic rack, and wherein each CPU subsystem is disposed on a processor subsystem blade inserted into one of a plurality of slots within the processor subsystem chassis.

12. The system of claim 11, wherein the memory complexes are disposed within a memory subsystem chassis of the electronic rack, and wherein each memory complex is disposed on a memory subsystem blade inserted into one of a plurality of slots within the memory subsystem chassis.

* * * * *